United States Patent [19]

Howells et al.

[11] Patent Number: 4,556,884
[45] Date of Patent: * Dec. 3, 1985

[54] DEPTH DEPENDENT MULTIPLE LOGGING SYSTEM

[75] Inventors: Anthony P. S. Howells; Anthony M. Dienglewicz; Raman Viswanathan; Jorg A. Angehrn, all of Houston, Tex.

[73] Assignee: Dresser Industries, Inc., Dallas, Tex.

[*] Notice: The portion of the term of this patent subsequent to Nov. 3, 1998 has been disclaimed.

[21] Appl. No.: 362,573

[22] Filed: Mar. 26, 1982

Related U.S. Application Data

[63] Continuation of Ser. No. 30,050, Apr. 13, 1979, abandoned, which is a continuation-in-part of Ser. No. 949,592, Oct. 10, 1978, abandoned.

[51] Int. Cl.$^4$ ................... E21B 49/00; G01V 1/00
[52] U.S. Cl. ................... 340/860; 73/152; 367/33
[58] Field of Search ........... 367/25, 33, 81; 33/302; 324/323; 73/151.5, 152; 340/860, 853

[56] References Cited

U.S. PATENT DOCUMENTS

| | | | |
|---|---|---|---|
| 3,257,639 | 6/1966 | Kokesh | 340/18 |
| 3,853,004 | 12/1974 | Westlake et al. | 73/151.5 |
| 3,991,611 | 11/1976 | Marshall, III et al. | 73/151 |
| 4,012,712 | 3/1977 | Nelligan | 340/857 |
| 4,233,839 | 11/1980 | Coates | 73/152 |
| 4,245,313 | 1/1981 | Coates | 364/422 |
| 4,276,599 | 6/1981 | Timmons et al. | 364/422 |
| 4,297,879 | 11/1981 | Howells et al. | 340/860 X |

OTHER PUBLICATIONS

Direct Digital Well Logging Brochure, Gearhart-Owen, Wire Line Services, 1976, pp. 1-29.

Primary Examiner—Charles T. Jordan
Assistant Examiner—Brian Scott Steinberger
Attorney, Agent, or Firm—Patrick H. McCollum; Richard M. Byron

[57] ABSTRACT

An improved well logging technique is provided for more accurately deriving and correlating a plurality of measurements made during a single traversal of a logging instrument through subsurface formations. In one exemplary embodiment, methods and apparatus are provided for deriving a more accurate and precise measurement of depth at which real-time logging measurements are made, and in particular for correcting anomalies occurring in the depth indication from cable stretch, yo-yo of the sonde in the borehole and the like. The more accurate and precise depth measurement is then utilized for generating well logging measurements on a depth-dependent basis, deriving at least some of such measurements in digital form and alternately transmitting to the surface digital and analog representations of such measurements. Furthermore, methods and apparatus are provided for deriving measurements of subsurface earth formation from a plurality of logging instruments combined in a single tool, wherein such measurements are made during a single pass through a borehole with the resultant measurement data correlatively merged, recorded and displayed.

14 Claims, 7 Drawing Figures

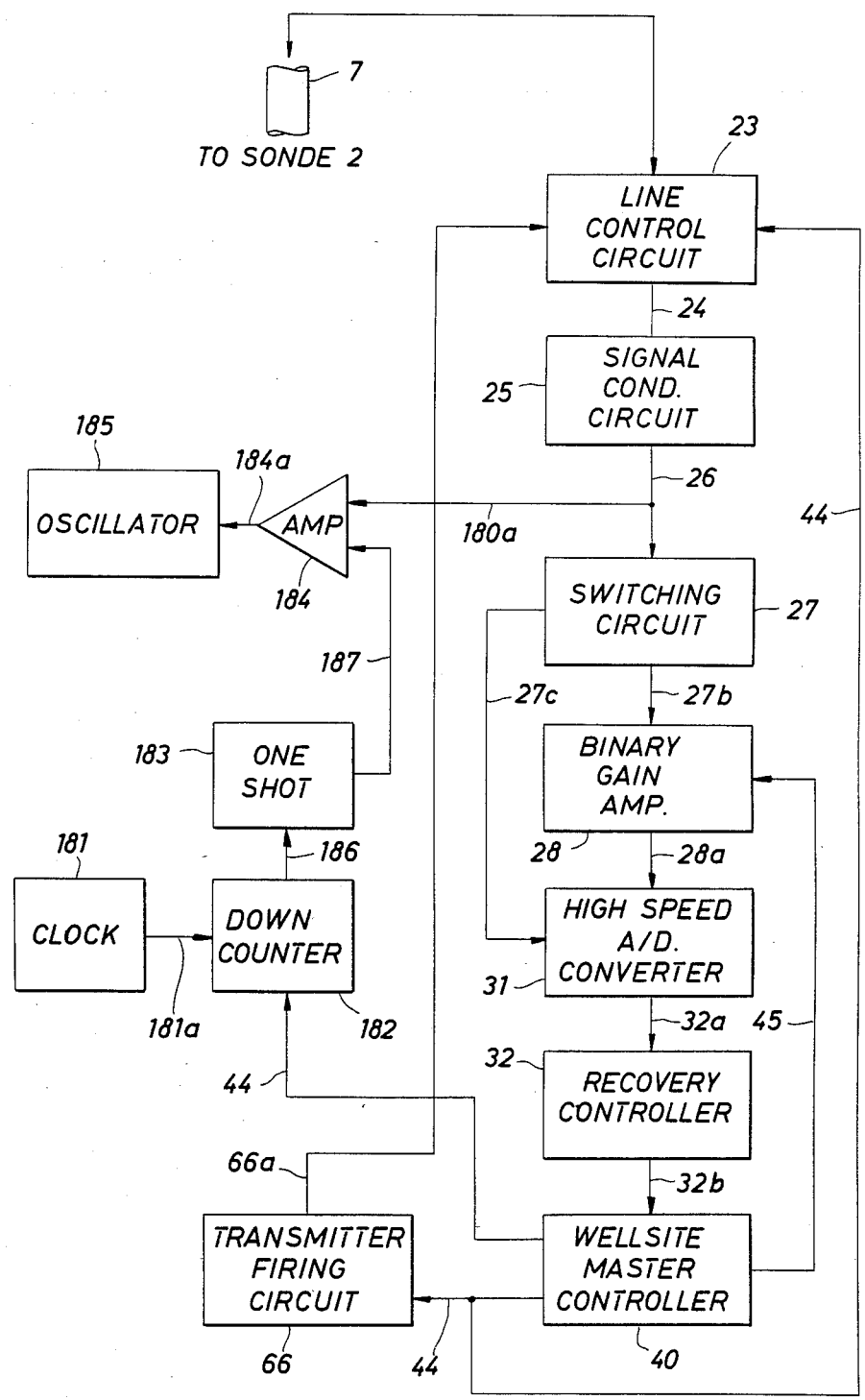

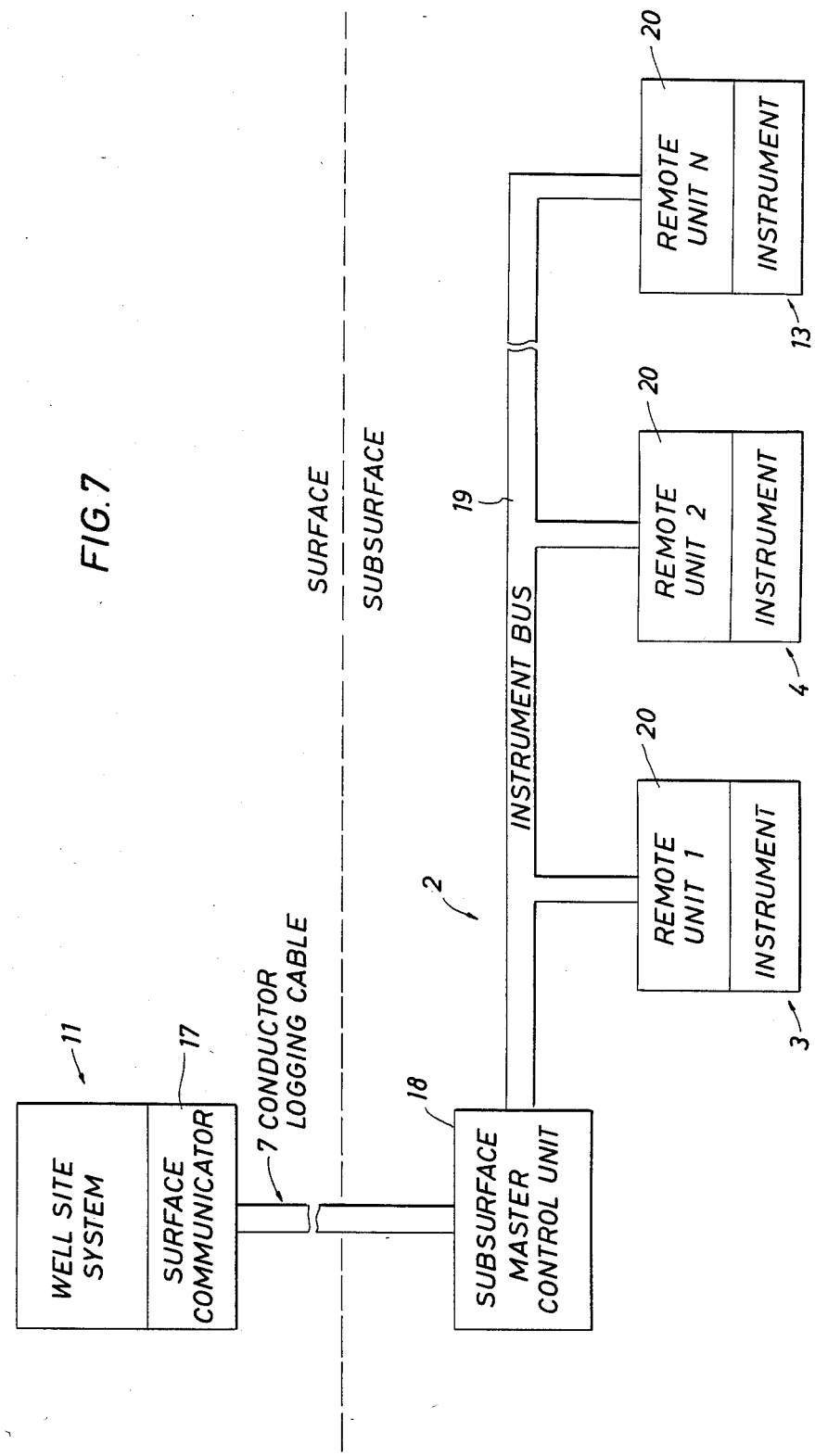

DEPTH DEPENDENT MULTIPLE LOGGING SYSTEM

RELATED APPLICATION

This application is a continuation of application Ser. No. 030,050, filed Apr. 13, 1979, now abandoned, which is a continuation-in-part of U.S. application Ser. No. 949,592, filed Oct. 10, 1978 for "Integrated Well Logging System and Method" now abandoned.

BACKGROUND

This invention relates to improved well logging methods and apparatus, and more particularly relates to novel methods and apparatus for providing a plurality of functionally integrated, depth-correlated subsurface measurements.

It is well known that oil and gas are found in subsurface earth formations, and that wells are drilled into these formations to recover such substances. However, it is usually necessary to survey or "log" the entire length of the borehole to ascertain if any of the formations contain significant recoverable amounts of oil and gas to justify completing the well.

In the early days of oil and gas exploration, wells were not extremely deep and information relating to the physical parameter of the subsurface formations was not complex. Accordingly, well logging was performed by a logging "tool" or sonde which was merely suspended at the bottom of the borehole at the end of a cable, and was then raised through the borehole as it generated measurements of one or more earth parameters. Circuitry was usually provided in the tool for converting such measurements into appropriate electrical signals which, in turn, were transmitted to the surface by one or more electrical conductors within the logging cable.

Over the years, however, these early deposits became depleted and with the continued search for oil and gas, wells became ever deeper and more expensive, requiring an increase in the sophistication of drilling techniques and improved knowledge with increasing detail reliability about the subsurface formations through which the well passed. In more recent years, oil and gas have become increasingly scarce with a corresponding increase in value. These factors have led to secondary and even tertiary-recovery projects which require even more detailed knowledge of the subsurface formations and, in particular, the fluids contained therein.

As wells became deeper, logging cables became longer and correspondingly hotter, their losses at both high and low frequencies becoming more severe. As a result, electrical signals containing information relating to the physical characteristics of the subsurface formations which have been developed by logging instruments became attenuated and distorted, reducing the accuracy of the information obtained. Further, limited cable band width has caused problems even when pulse/digital techniques are employed utilizing digital encoding of the measurement data in the tool and prior to transmission to the surface.

To compound the above-described problems, new logging instruments were being provided which had the ability to measure a plurality of physical parameters. Additionally, the practice developed whereby more than one tool was placed in a common chassis. For example, it is well known in the prior art to provide a logging tool having up to three data sources which may also be required to monitor parameters indicative of proper tool operation, such as temperature or other similar parameters which require an increased need for handling multiple data sources.

The above-described data recovery problems are compounded by the requirement for locating thin formation zones containing oil and gas. However, there is no single well logging technique or device which can provide a direct indication and evaluation of oil or gas in a particular formation of interest. Instead, a variety of logging techniques have been devised, which measure various different physical parameters of the earth substances adjacent the borehole, whereby such information can then be used according to selected functional relationships to determine those formations of probable or possible value.

For example, it will be readily apparent that if the oil and gas are diffused or dispersed in the cavities between the pore spaces within a formation, then a formation of greater porosity will more likely contain significant recoverable amounts of oil and gas than will a formation of lesser porosity. Accordingly, techniques and apparatus for deriving an indication of the relative porosities of the earth materials along the borehole will obviously be of value in determining the depths as which oil and gas will most likely be found in commercial quantities.

Also of value are techniques and devices used to measure the electrical resistivity of the earth substances along the borehole, and other devices and techniques used to measure the travel time or velocity of an acoustic pulse moving through such materials. In such case, the measurements are usually generated in the form of a current or voltage representative of the earth parameters being surveyed.

Another type of logging technique involves measurement of nuclear radiation occurring within a subsurface formation. The radiation may be naturally occurring or created by bombarding the interior of the borehole with radiations such as neutrons or gamma rays which thereafter engage in various interactions with the nuclei of the formation materials. Measurements are accordingly made of radiations which enter the well naturally or as a result of bombardment, and which may then be counted to provide indications of various earth parameters of interest. More particularly, the resulting radiations of interest may be sensed by a scintillation counter or the like, which generates electrical pulses as a function of those radiations detected, and these pulses may be then counted either at the surface or by suitable circuitry in the logging tool.

Since no one earth parameter can of itself provide a definitive and conclusive indication of the presence of oil and gas in commercial quantities, there has been a continuing need to perform as many different types of logging measurements as possible.

As logging tools become more sophisticated, such as those employing neutron generators capable of being rapidly pusled on and off, the problem of handling multiple data sources increases. Accordingly, the prior art contains neutron-lifetime tools, porosity tools, induction tools, resistivity tools, chlorine logs, shale indicators, carbon oxygen and calcium silicon logs, and any number of other specialized tools. However, no single tool will perform more than a few of these functions whereas in a single well, many such parameters are important. The failure to measure some of them has in the past led to an incorrect evaluation of the physical parameter of the subsurface formations. As a result, prior art techniques have provided data which cannot be clearly and reliably interpreted in the absence of other different but functionally correlative measurements. This, in turn, has also contributed to the need to provide logging instruments and systems for generating a plurality of different logging measurements, whereby the array of such measurements will be more informative as to the character of the earth materials of interest.

However, instruments cannot merely be attached, end on, to provide the increase in logging measurement information. Physical and operational constraint require careful positioning of the various instruments making up a multi-instrument tool. For example, the physical strength of the mandrel material used to form some instruments will not support the weight of other instruments. Additionally, operational constraints must be considered in placement of the instruments within the tool so that operation of the particular tool will not interfere with the measurements obtained by the other instruments therein. Further, some instruments, particularly those measuring nuclear radiation, can be calibrated as a unit and should be connected as such.

Unfortunately, as the number of different logging measurements generated by a single tool increases, so does the difficulty in recovering the measurement signal in both analog and digital forms. Most instruments are free running, i.e., they continually generate measurement data signals for transmission. As above-mentioned, when the measurement data signals are transmitted to the surface, various problems may occur which degrade the signals causing an attendant loss in data accruing. Cross talk is such a problem which may occur between conductors in the logging cable, degrading the measurement signals. Another problem is that different instruments require different time sequences for providing meaningful measurements. In particular, where the instruments are generating free reunning measurements as above-mentioned, the various measurement signals recovered at the surface can only be synchronized approximately and with difficulty. Still, another problem is some instruments utilize up to five conductors for their operation. For example, one type of logging technique utilizes an instrument which with two power conductors, a transmitter select conductor, a receiver select conductor and a signal conductor for transmission of data to the surface. Thus, it may be seen that use of this instrument even with a standard seven conductor logging cable precludes the use of a number of other instruments in combination.

To add to the above-mentioned problems, in recent years it has become a matter of extreme importance to conduct logging operations in deep wells with a minimum number of separate traversals of the borehole. This requirement has developed for a number of reasons. One reason is the fact that when deep holes are drilled a very large and expensive drilling rig is required, and this rig must remain in position at the well site but inoperative during the logging operation. Thus each hour required for logging may be counted as expense which may amount to hundreds or even thousands of dollars essentially wasted.

Another reason for avoiding lengthy and protracted logging procedures is the risk that the newly drilled hole may collapse or cave in or otherwise be damaged such that remedial work or even redrilling of the hole might be required. Further, it has been found that numerous traversals of the logging cable through the borehole may result in damage to the casing in the upper or intermediate portion of the hole where casing is ordinarily installed preparatory to drilling the lower portion of the well where potential hydrocarbon productive zones are sought or expected. In successively traversing the well, the hardened steel sheath of the logging cable may slice into the casing with consequent damage thereto.

Additionally, it is important that the logging measurements be acquired as soon as possible after drilling is completed in order that there be minimum undesired effects due to progressive invasion of drilling mud filtrate into permeable formations. Such filtrate invasion renders the detection of hydrocarbons more difficult and less accurate with the passage of time. Also, it is desirable to acquire all the logging measurements under the same conditions of borehole and formation temperature, as will be true if all measurements are taken at the same time.

However, even more important than the above-mentioned reasons is that each of the several logs need to be accurately correlatable with every other log with respect to depth in the borehole. Unfortunately, since the logging cable is elastic, variations occur which make such correlation difficult between instruments connected in a single chassis and utilized for a single run, not to mention the difficulties encountered in correlating. Nonetheless there is substantial advantage in making different logging runs made in multiple passes.

Customarily, as each logging measurement is obtained, an approximation of the depth at which the measurement is obtained is simultaneously derived and correlated to the measurement in a time relationship. However, when tools capable of generating different measurements during the same run are used, the depth approximation must be held constant while moving the tool past the point represented by that depth. This is to permit offsetting the instrument for correlation of the different measurements of the same formation. Unfortunately, this method of offset introduces added errors into the correlation between the measurements and into this time relationship with depth.

Typically, the conventional means of determining the length of cable lowered into the well has been the method of determining the depth of a logging tool within the well. Many devices have been proposed for measuring this length. Some of these are devices mechanically coupled to the sheave wheel while others resort to the use of detection devices responsive to magnetic marks on the cable or on the sheave wheel itself.

However, forces within the borehole act upon the logging device or the logging cable to cause changes in cable length which are not indicated by the surface measuring devices. Some of these forces include the weight of the logging tool and the weight of the cable connecting the tool to the reeling device at the surface of the earth and which cause a stretch in cable, positioning the logging tool at a location lower than indicated by the measuring instrument. Additionally, various forces within the well act on the logging instrument to slow it down. When this occurs in an upward traverse of the well, the cable begins to stretch and the instrument is situated again at a position different than indicated by the surface measuring device. As the instrument frees, it may override the position indicated by the surface indicator device and go through a series of oscillations termed in the art "yo-yo" until it is once mations traversed by a borehole, including generating an indication of the depth of the formations investigated, and generating, in response to the depth indication, an indication of a selected characteristic of the formations.

Another particular feature of the invention is provision of method of investigating the subsurface earth materials traversed by a borehole by establishing a communication channel from the surface and into and along said borehole, generating an electrical command signal functionally indicative of a selected depth within the borehole, electrically measuring at least one physical characteristic of earth materials present at the selected borehole depth in response to the command signal, and transmitting the electrical measurement obtained through the communication channel and to the surface.

A further feature of the invention includes providing a method of investigating the subsurface earth materials traversed by a borehole by generating an electrical commond signal functionally indicative of the depth of a logging tool within the borehole and electrically measuring at least one physical characteristic of earth materials at that depth and transmitting the measurements obtained from within the borehole to the surface of the earth in response to the command signal.

Another feature of the invention includes providing a method of investigating the earth materials traversed by a borehole, by generating an electrical data signal functionally representative of a selected physical characteristic of the earth materials, generating an electrical command signal functionally indicative of a selected depth of a logging tool in the borehole, and deriving from the data signal a digital representation of characteristics of the earth materials at the selected depth and in response to the command signal.

Another particular feature of the invention is provision of apparatus for investigating the subsurface materials traversed by a borehole which, in conjunction with a well logging tool suspended in and movable through said borehole at the end of an electrical cable, incorporates command circuitry for generating and transmitting a command signal through the electrical cable to the logging tool which is functionally indicative of the depth of the tool in the borehole measurement circuitry for electrically measuring at least one characteristic of the earth materials adjacent and sampling circuitry for encoding and transmitting signals related to the measurements thus obtained through the cable and to the surface.

A further particular feature of the present invention is provision of apparatus for investigating the subsurface earth materials traversed by a borehole which has command circuitry for generating an electrical command signal functionally indicative of a selected depth within the borehole, sensing circuitry for generating electrical measurements of a physical characteristic of earth materials at the borehole depth, and sampling circuitry for encoding and transmitting the measurement obtained from within the borehole to the surface of the earth in response to the command signal.

These and other features and advantages of the present invention will become apparent from the following detailed description, wherein reference is made to the figures in the accompanying drawings.

IN THE DRAWINGS

FIG. 4 is a more detailed functional representation of the data encoder circuitry forming a portion of the logging sonde depicted in FIG. 1.

FIG. 6 is a more detailed functional representation of the apparatus of FIG. 2 in an operating mode for receiving and processing analog data transmitted to the surface.

FIG. 7 is a simplified functional overall representation of an alternative embodiment of the circuitry depicted in FIG. 4 for providing data and command communications between the surface and subsurface units.

DETAILED DESCRIPTION

Figure 1:
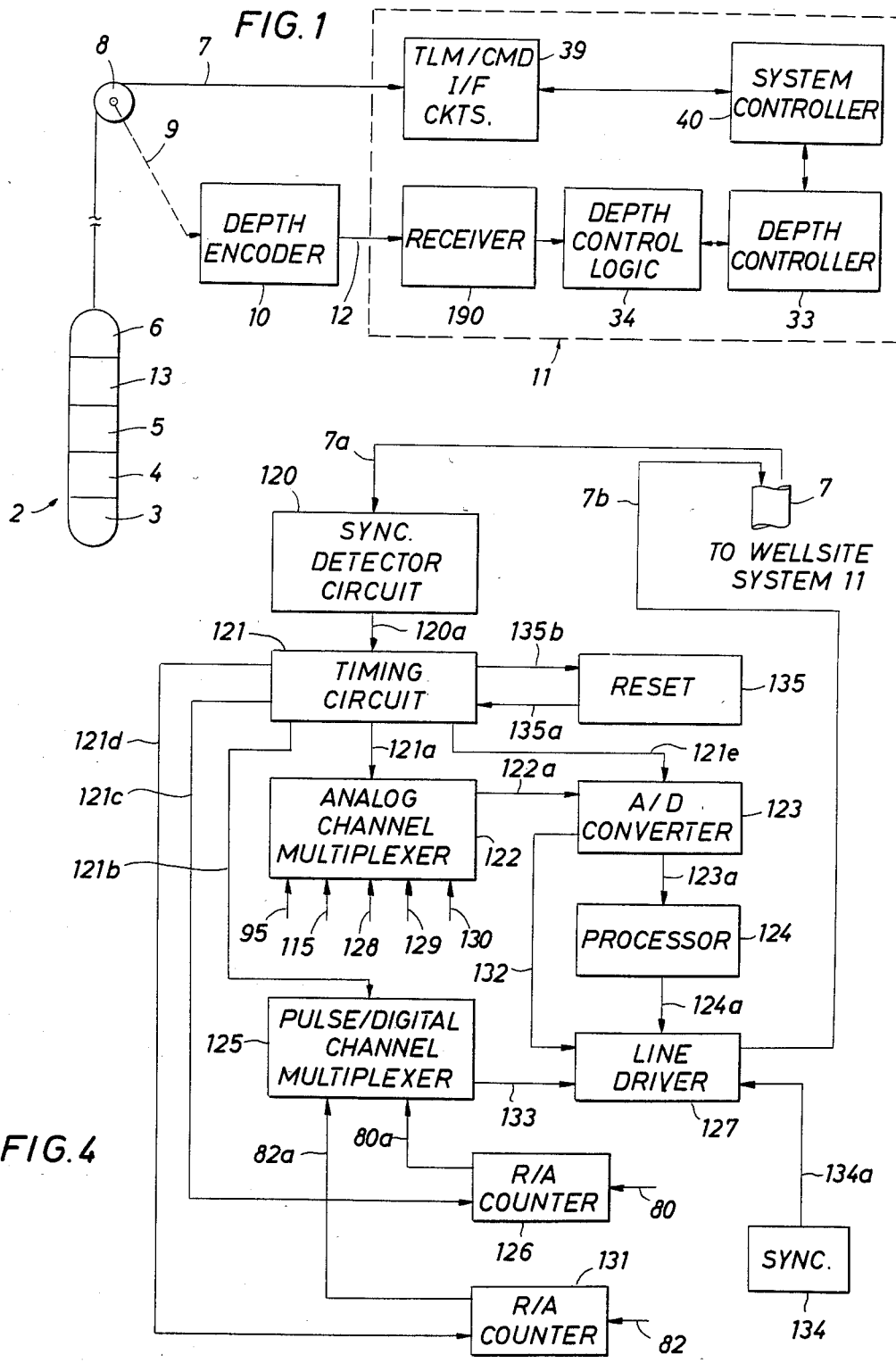
FIG. 1 is a simplified functional overall representation of the well logging system of the present invention.

Referring now to FIG. 1, there may be seen a simplified functional diagram of a well logging system incorporating one embodiment of the present invention, and wherein there is more particularly shown a logging sonde 2 which may suitably include formation measuring instruments such as radioactivity logging section 3, induction logging section 4, acoustic logging section 5, resistivity logging section 13 and a data encoder or pulse code modulation section 6, all arranged to provide appropriate measurements of the formations surrounding a subsurface borehole (not depicted). Measurements from these sections may be conveniently transferred from the borehole to the surface by way of a conventional logging cable 7 which is arranged to rotate a sheave wheel 8, or the like, to provide a correlative indication of the borehole depth at which such measurements are taken. More particularly, the sheave wheel 8 may also be conveniently coupled to suitable depth encoder circuitry 10, by an electro-mechanical interconnection 9, whereby the depth encoder circuitry 10 will deliver a functionally correlative depth measurement signal 12 to the surface portion of the well site system 11, which, as will be described hereinafter in greater detail, processes signal 12 to develop a command signal for initiating a measurement of the subsurface formations as a function of depth measurement signal 12.

In developing depth signal 21 is must be remembered that the most basic measurement applied to well bores is that of depth with the depth of the subsurface formations usually being referred to some well defined and unchanging surface location. Accordingly, depth is abscribed to subsurface features located during the drilling process or located when some other parameter is measured for the primary purpose of later placing a logging instrument in or near a desired feature such as an oil bearing formation merely by lowering the device to the requisite depth within the borehole.

Boreholes are customarily drilled with a bit attached to assemblies of pipe. Thus, depth is originally determined by measuring the length of each pipe in the assembly before it is put in the well bore. Subsequent mechanical operations in the borehole frequently accomplished by lowering devices on similar links of again at the position approximately indicated by the surface measuring instruments. As an oil bearing strata may be two to five feet or less in thickness, the error introduced by such inaccurate depth indications can be excessive for an accurate determination of the location of such a formation when attempting to correlate the measurements obtained from different instruments.

Various prior art techniques have been developed to ascertain more accurately the position of a logging tool within the well at the time a measurement of a parameter of a subsurface formation was made and it depends for accuracy upon the simultaneous occurrence of the instrument making a measurement at precisely the depth indicated by the surface instrumentation. If, as is often the case in the prior art, the instrument was at a depth different than that indicated, attempts to move a second instrument in the string into position may result in erroneous data.

In summary, the foregoing problems of the prior art although attempting to provide technology for comparing logging data obtained of the same subsurface formation from different logging instruments have suffered limitations on the amount and quality of the data obtained which preclude accurate correlation of the various parameters obtained.

Accordingly, deficiencies in the prior art are overcome by the present invention wherein improved well logging methods and apparatus are provided whereby the depth and formation parameters obtained in such logging operations are correlated in a depth ranker than a time dependent relationship.

SUMMARY OF THE INVENTION

In the preferred embodiment of the invention, an improved well logging system is provided which is directed to obtaining measurements of subsurface formation parameters as a function of depth. More particularly, improved means are provided for developing a signal directly related to the depth of the logging instrument and thereafter initiating a sequence of measurements of the physical properties of the subsurface formations adjacent the logging instrument at the ascertained depth and transmitting signals functionally representing the results of such measurements to the surface for processing.

The well logging system contains three major elements including an improved depth measuring and correction system, a surface command generating and data processing element, and a subsurface telemetry encoder/transmitter element. In operation, the depth measuring system provides an indication of the depth of the logging instrument within the well bore, permitting correction for such variable as cable stretch, instrument oscillation for "yo-yo", and instrument offsets. As the corrected depth information is obtained, is coupled into the command generating system of the surface element whereby a depth dependent command is transmitted to the subsurface instrument to initiate, among other things, subsurface parameter measurement sequences, measurement data encoding and transmission of measurement data to the processing section of the surface element.

In the preferred embodiment, the intercommunications between the subsurface telemetry system and the surface element preferably includes provision for transmitting analog signals such as an analog representation of an acoustic signature between transmissions of certain of the frames of digital data.

It is a particular feature of the invention to coordinate different logging measurements to provide more information. Accordingly, the preferred embodiment includes provision for converting all analog signals, such as the above-mentioned acoustic signature signal, to digital form whereby the real time data signals from the logging instrument may be more easily correlated as a function of the formation depth.

Accordingly, the surface equipment includes a "primary" storage whereby real-time data signals from the tool are stored also in response to the depth-dependent command signal prior to processing. In addition, however, a "secondary" data storage is provided whereby these real-time signals, which are all in digital form, may also be stored for later reproduction and re-use.

It is a particular feature of the present invention to provide for correlatively merging real-time data obtained from several instruments combined in a single chassis or tool and which perform measurements of the subsurface formations as a function of borehole depth. In this respect, the measurement data from different logging instruments may be separately, although correlatively, included in a common display or record, or a function of such logging data may be appropriately derived on a real-time basis and included with the individual logging signals being displayed and recorded. Novel circuitry and techniques are provided for more effectively correlating such real-time data from the various instruments in order to enhance the informative aspects thereof.

Accordingly, it is a feature of the present invention to provide improved methods and apparatus for making depth-dependent integrated measurements of subsurface earth formations.

It is another feature of the present invention to provide improved methods and apparatus for accurately determining the depth of the logging instrument within the earth borehole and for correcting for deviations created by cable stretch, instrument oscillation and the like.

It is still another feature of the present invention to provide improved well logging methods and apparatus for deriving subsurface earth measurements in digital or analog form in response to command signals generated as a function of depth.

It is yet another feature of the present invention to provide improved methods and apparatus for permitting transmission of analog and digital measurement data on a time share basis to optimize use of the available cable bandwidth.

It is a further feature of the present invention to provide methods and apparatus for deriving real time well logging measurements according to preselected functional and physical relationships.

It is another feature of the present invention to provide improved well logging methods and apparatus for deriving physical measurements dependent upon depth of the logging instrument in the borehole.

It is a further feature of the present invention to provide well logging methods and apparatus, wherein a plurality of subsurface, real-time measurements are continually sampled on a depth dependent basis.

It is another feature of the present invention to provide improved methods and apparatus for correlating real time well logging measurements taken at different depths in the borehole.

A particular feature of the present invention is to provide a method of investigating subsurface earth for-assembled pipe so that relocating positions within the borehole is a simple matter.

However, there is another group of operations in which relatively small devices or assemblies are lowered in the borehole by means of a continuous length of line or cable. Well logging or formation diagnostic measurements are customarily done this way. Thus, to find the depth to which a well logging instrument has been lowered requires that the length of the cable between the surface and the instrument be established.

The traditional method and the one still most commonly used today is to pass the cable as it is lowered or raised, over a wheel of known circumference so that counting the revolutions of the wheel gives an indication of cable length that has passed into or out of the well bore. Various refinements of this technique have been made to increase the accuracy of the translation of wheel revolutions into linear length of cable or the depth reached within the borehole.

As the technology of formation evaluation by measuring multiple physical parameters as increased in scope and multiplicity, so the importance of accurately knowing the depth at which each measurement was taken has increased. As an example, it is clearly imperative that if a measurement made on one occasion in a well is to be used with a second measurement taken on another occasion to compute a third parameter then the two measurements must be exactly synchronized with respect to depth.

The present invention is directed to a system whereby a succession of discrete measurements of borehole of formation parameters is initiated on the basis of depth and which may be initiated in direct response to a particular depth being reached. Accordingly, the need for precision in the depth measurement itself is paramount and required to insure that all later discrete formation or borehole measurements correspond exactly to the location in the borehole where the first measurement was made.

The present invention is directed to a system which requires such precision in depth measurement to develop the correlative depth signal 12 which is coupled through a signal conditioning receiver 190 into the depth logic 34 and then to depth controller 33, as will be described hereinafter in greater detail. Thereafter, the corrected depth measurement signal derived in logic 34 is coupled from controller 33 into system controller 40 for use in generating commands functionally related to depth which are transmitted to sonde 2 to initiate the above-mentioned measurement as discussed in greater detail with respect to FIG. 2.

Further, positioning a plurality of instruments in a single chassis as shown by sonde 2 provides an initial coarse depth-relationship between the various instruments contained therein. Accordingly, once a measurement of a subsurface formation has been made by acoustic section 5 for example, it is a simple matter to move sonde 2 to position radioactivity logging section 3 adjacent the same formation. The difficulty addressed by this invention is, however, encountered when, during a second pass of a logging instrument through the borehole, an attempt is made to position acoustic section 5 adjacent the same subsurface formation at the particular depth measured during the first logging pass. It is only with precision in depth measurement that such positioning can readily be accomplished.

Figure 2:
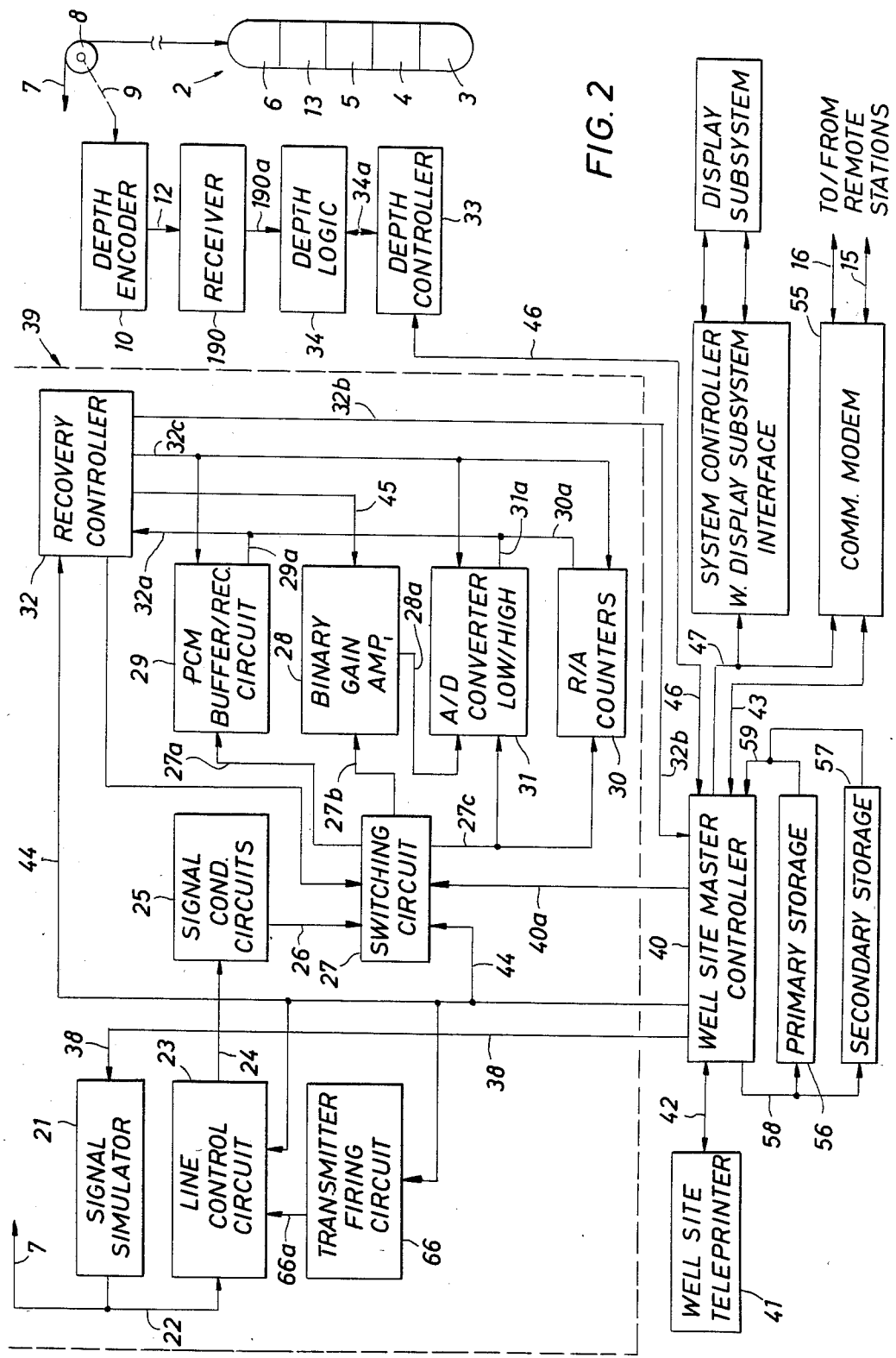
FIG. 2 is another functional representation of the present invention, and more particularly illustrating the basic functional details of the surface control and data circuitry of the well site system.

Referring now to FIG. 2, there may be seen a simplified functional diagram of the circuits which comprise the surface portion of well site system 11. As will hereinafter be explained in detail, the sections of the logging sonde 2 are preferably adapted to deliver their respective measurements to the conductors composing the logging cable 7 in a manner whereby all of the measurements are delivered to the surface in a sequential relation according to a preselected format. It should be noted that information or commands may also be desirably transferred from surface circuitry to the logging instrument. For example, it may be desirable to control various transmitters and receivers contained in acoustic logging section 5 from the surface. Accordingly, it may be seen from FIG. 2 that at appropriate times and in response to a command signal 44 from a wellsite master controller 40, transmitter firing circuitry 66 may be caused to generate transmitter firing signals 66a for the purpose of controlling the various circuitry in the acoustic logging section 5 of the sonde 2. This transmitter firing signal 66a may preferably be delivered to a conventional line control circuit 23 which couples the signal 66a to the appropriate conductors within the logging cable 7.

As will be explained hereinafter in greater detail, the transmitter firing signal 66a is also used as a command signal for initiating a sequence for transmitting digital data to the surface. Initiation of this sequence permits frames of digital and radioactive pulse data to be transmitted to the surface in interleaved relation with analog signals such as those obtained from the acoustic logging section 5.

As indicated in FIG. 2, when measurement signals are received from sonde 2, the output of the logging cable 7 is preferably also delivered to a line control circuit 23 which, in turn, passes the signals as its output 24 to a suitable arrangement of signal conditioning circuits 25. Depending on the type of signal present, the conditioned signals 26 are coupled through a suitable switching circuit to the appropriate processing circuitry. Thus it can be seen that digital or PCM data will be coupled into a PCM buffer/receiver circuit 29, analog data into a binary gain amplifier 28, or in a further alternative, into a low speed/high speed analog-to-digital converter 31 and radioactive pulse counts into suitable radioactivity pulse counters 30, by way of signal conductors 27a, 27b, or 27c, respectively.

In the present embodiment, the switching provided by switching circuit 27 is predetermined by the preselected measurement signals expected from the downhole instrumentation. Thus, in this embodiment the switching paths will be determined by the data recovery format. However, and as will hereinafter be explained in greater detail, it will be apparent to those versed in the art, that for other embodiments it may be desirable to provide real time switching under the control of the wellsite master controller 40 whereby controller 40 commands switching in sequence with the data format.

It is well known that the outputs from a conventional sonde 2 will be either analog form, or in the case of radiological measurements, will be composed of pulses which occur in a random manner. As will hereinafter become apparent, however, it is particularly desirable for the purposes of the present invention, that these signals be presented to the surface circuitry in digital form. Accordingly, and as more particularly depicted in FIG. 1, the sonde 2 will preferably include a data encoder or pulse code modulation (PCM) data formating and multiplexing circuit 6 for encoding such signals in digital form before delivery to the PCM buffer/receiver circuit 29 shown in FIG. 2. If the signals are not so encoded, however, then they may be transmitted to the surface as an analog signal and thereafter conveniently applied to a suitable analog/digital converter 31 or the like, before being processed and recorded.

Referring again to FIG. 2, it will be seen that pulses deriving from radiological measurements may be transmitted to the surface as a raw pulse count and conveniently be applied to appropriate counters 30 and the like, which will encode the counts into a digital form for processing and recording. Accordingly, the signals being generated by the radioactivity section 3 of the sonde 2, will originate as a train of electrical pulses indicating the occurrence of radiations emanating from the borehole materials surrounding the sonde 2, and will therefore be suitably delivered to the pulse counters 30 which, alternatively, produce a suitable digitized representation of this data as output signal 30a.

On the other hand, typical analog output signals such as produced by the acoustic logging section 5 of the sonde 2 may, conventionally, be delivered to the surface in the form of analog measurements representative of the physical characteristics of the borehole material adjacent the sonde 2. Accordingly, such analog outputs from switching circuit 27 which compose signal 27c will, in turn, be converted to digital representations of the data sought to be obtained. These representations, which are indicated as output 31a, will accordingly be applied to the input 32a of the recovery controller 32.

Preferably, however, and as above-mentioned, the analog signals may be digitally encoded in PCM circuit 6, transmitted to the surface and coupled directly into PCM buffer/receiver circuit 29 from switching circuit 27.

It will be noted that the analog-to-digital converter 31 receives input signals 27c and 28a from both the switching circuit 27 and the binary gain amplifier 28. The reason for this is that, in some cases, signals generated from the induction logging section 4 and the acoustic logging section 5 of the sonde 2, which are transmitted to the surface in analog form, are sufficient in amplitude to be applied directly to the analog-to-digital converter 31. On the other hand, such signals are often of such large amplitude, or alternatively, have been attenuated by the logging cable 7 to an extent that they do not fall within the dynamic range of converter 31 and must accordingly be attenuated or amplified, respectively, before they can be properly handled by the converter 31. Accordingly, the switching circuit 27 will respond to route such signals to the binary gain amplifier 28 prior to conversion of the analog signal into digital form at converter 31.

As above-described, the wellsite master control 40 can be adapted to generate a command signal 44 to the switching circuit 27 to route its output either in the form of a digital signal 27a to the PCM buffer/receiver circuit 29, or in the form of an analog signal 27c which is delivered to the converter 31 or to the pulse counters 30. If, as hereinbefore stated, the signal 27c is of an insufficient amplitude to be properly handled by the converter 31, or if the amplitude is too great for the dynamic range of the converter 31, then the master controller 40 will, according to program, generate a command signal 40a to cause the switching circuit 27 to deliver its output signal 27b (instead of signal 27c) to the binary gain amplifier 28. It will be noted that binary gain amplifier 28 may be provided with a suitable gain control signal 45 which serves the purpose of continuously adjusting the gain of binary gain amplifier 28 in response to command signal 44 delivered to recovery controller 32 from master controller 40. It will be seen that because the input to analog-to-digital converter 31 may be periodically interrogated by master controller 40 in a manner to be described hereinafter, master controller 40 may cause gain control signal 45 to appropriately adjust gain of binary gain amplifier 28 so as to insure that input signal 28a is maintained within the dynamic range of analog-to-digital converter 31. Accordingly, the amplified signal 28a, which is produced by the binary gain amplifier 28, is then delivered to the converter 31 in lieu of the output signal 27c.

Referring again to FIG. 1, it may, for the purposes of illustration, be assumed that the sonde 2 is composed of a plurality of measurement producing instruments such as radioactivity logging section 3, induction logging section 4, the acoustic logging section 5, and resistivity logging section 13, and that all of these instruments are continually and simultaneously producing and delivering meaningful measurement data signals to the logging cable 7. It is essential that the wellsite system 11 sort and handle these signals in a manner to distinguish one from another, as well as to handle such signals in correlation with appropriate indication of the depth at which such signals originated. Accordingly, the analog-to-digital converter 31, the pulse counters 30, and PCM buffer/receiver circuit 29, will all include appropriate buffer circuitry, whereby these signals may be stored until the wellsite master controller 40 generates its command signal 44 to cause the recovery controller 32 to interrogate the components selected. Upon such interrogation, which is indicated in FIG. 2 by the interrogation signal 32c, the recovery controller 32 will cause the appropriate or selected component to transfer one of outputs 29a, 31a or 30a to the recovery controller 32 which, in turn, conducts such information to the master controller 40 in the form of output 32b. Upon receiving output 32b, the master controller 40 conducts such output to either the primary storage facility 56, or the secondary storage facility 57 by means of the output signal 58.

As hereinbefore stated, the measurements provided by the logging sonde 2 must be correlated with the corrected depth at which such measurements were commanded to be taken. Accordingly, it should be noted that for the master controller 40 to generate its command signal 44, it first generates an appropriate request over depth data/control signal 46 to cause the depth controller 33 to deliver the information it has previously taken from the output 34a of depth logic 34. This data, which also passes to the controller 40 by way of the depth data/control signal 46, is used by controller 40 to develop depth related command signals. Further, the requested information is stored in controller 40 to be correlated effectively with the logging data signals provided by the recovery controller 32 in the form of output 32b.

Still referring to FIG. 2, the depth correlated logging data signals derived from the various measurement instruments may then be correlated, each to the others, using the depth correlation of each data signal as well as the known physical separation between the various instruments in the common chassis. As shown, the correlated logging signals may be coupled over conductor 47 through a system controller/display subsystem interface 68 for visual display of any of various display subsystem 70 known in the art. Among these, for example, are CRT displays, plotters and film recorders. Additionally, the depth correlated logging signals may be coupled through a communications MODEM 55 over conductors 47 and 43 for transmission by any of several well known methods to remote locations. Conversely, commands and/or data inputs may conveniently be coupled into the wellsite master controller through MODEM 55 from the same remote stations.

Figure 3:
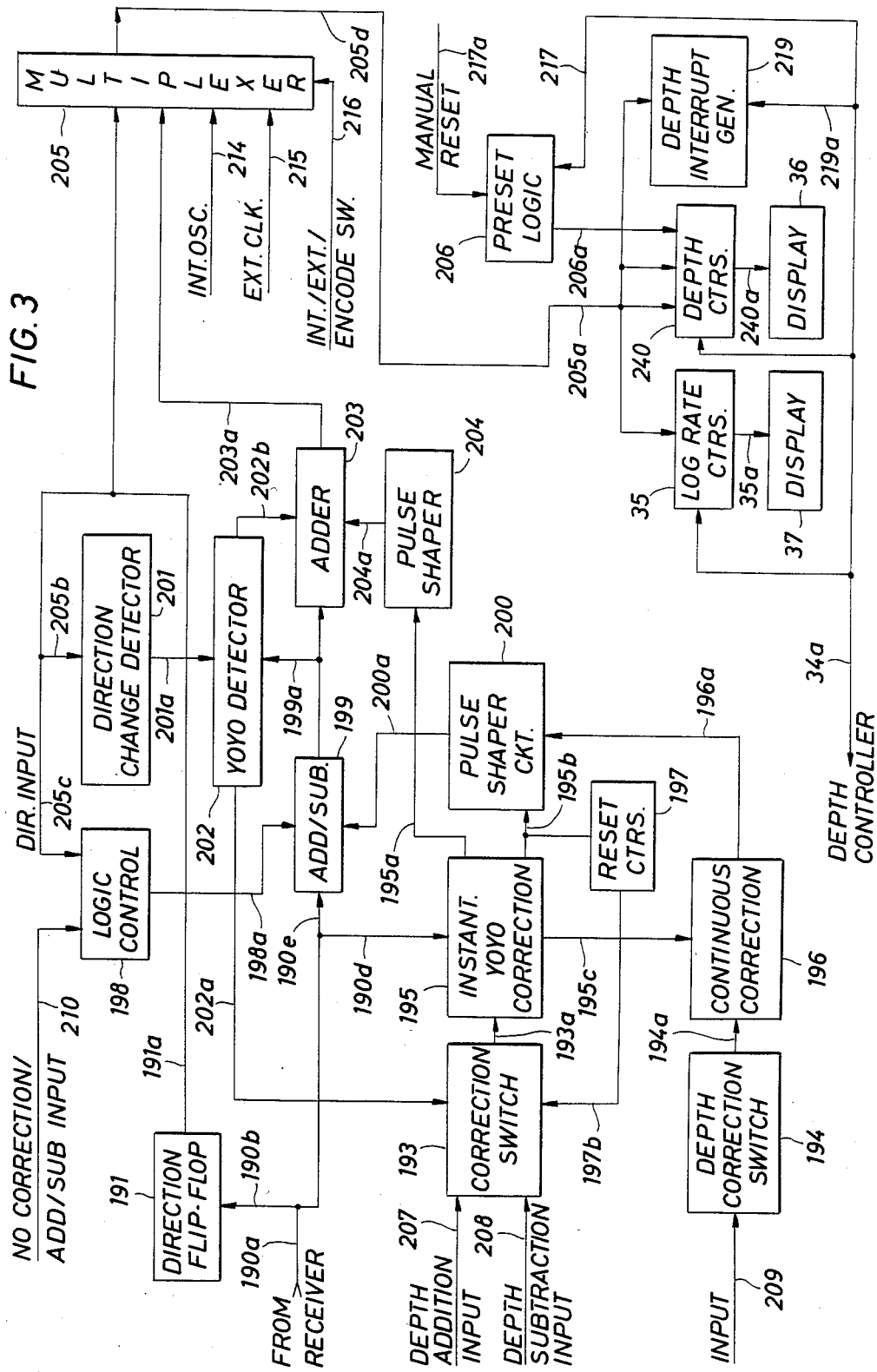
FIG. 3 is a more detailed functional representation of the depth controller portion of the apparatus represented in FIG. 2.

It will be noted that in order for depth logic 34 to provide appropriate information to depth controller 33, information from depth encoder circuitry 10 may conveniently be transmitted to receiver 190 by means of depth measurement signal 21, and from receiver 190 to depth logic 34 on receiver output 190a. Referring now to FIG. 3, there may be seen a more detailed functional diagram of one embodiment of the depth logic 34 of FIG. 2. In a typical well logging operation, it may be appreciated that it is often desirable to obtain at a given moment or in the alternative, at preselected depth intervals, information relating to the depth of sonde 2 in the borehole, for example, and the rate and direction at which sonde 2 is traveling within the borehole. Still further, as hereinbefore noted, because it is a feature of the present invention to generate logging measurements on a depth-dependent basis, it is neccessary for wellsite system 11 to generate appropriate depth measurement signals to indicate to master controller 40 when sonde 2 is at preselected depths in the borehole. Moreover, in order to take such logging depth, rate and direction measurements accurately within reasonable limits, it may be necessary to correct inherent inaccuracies well known in the well logging art. These inaccuracies may arise, for example, from dimensional variations of sheave wheel 8, logging cable 7 stretch and non-uniform movement of the sonde through the borehole which results in oscillation of the measuring sheave wheel 8, commonly known as "yo-yo", due to widely varying tensions impressed on the logging cable 7. Accordingly, the purpose of depth logic 34 is to provide information required in the logging operation related to logging rate, depth, direction, and the like, as well as to provide to master controller 40, for example, depth interrupt signals, at preselected depths, instructing master controller 40 when to interrogate various components of the system through recovery controller 32. It is yet a further purpose of depth logic 34 to compensate this information for inaccuracies such as those herein described and to provide for preselected adjustments of this information so as to permit the merger of two or more sets of logging data taken at different times, for example, and to correct for depth offsets as described hereinafter.

Referring briefly to FIG. 2, a depth encoder 10, comprising an electronic pick-up shaft encoder, is provided for generating a series of depth pulses functionally related to the angular motion of an encoder drive shaft 9 and sheave wheel 8. It will be noted that these depth pulses may also be related to travel of the logging cable 7 over sheave wheel 8 and thus to travel of sonde 2 within the borehole due to the fact that this travel causes sheave wheel 8 to rotate in response thereto. The encoder utilizes a circular wheel having light transmitting windows formed therein and positioned between a light source and receiver so that as the wheel rotates in functional relation to the rotation of the shaft 9, the light sensitive receiver detects the light transmitted by the source through the windows and generates pulses in response thereto. These window on each encoder provide a train of output pulses per each foot of cable movement or a corresponding train of output pulses for each meter of cable movement. In this manner, only one wheel is required to permit the system to be calibrated for either the English or metric systems.

The above describe window additionally provide two sets of pulses for the angular increments of rotation relating to both the English and metric measuring system. The pulses are produced with one set being phased with a 90 degree lag or lead to the other. As will be explained hereinafter in greater detail, this enables direction of rotation of the sheave wheel 8 and hence the direction of cable movement to be established.

After the encoder 10 generates these depth related pulses, they are transferred over signal conductor 12 to a suitable receiver 190. This receiver 190 provides necessary signal conditioning prior to transferring these depth pulses over conductor 12 on receiver output 190a to the depth logic 34 of FIG. 3.

Referring now more particularly to FIG. 3, it will be noted that the depth logic 34 will operate upon the pulse information related to the depth of the sonde 2 contained in receiver output 190a, and will process input data from other sources as well in a manner to be described hereinafter, so as to provide to depth controller 33 on output 34a all depth and logging rate information necessary for the proper operation of wellsite system 11.

Assume for purposes of illustration that no corrections to the depth pulse output 190a from receiver 190 are necessary, and that each pulse therefore accurately relates to a preselected incremental movement of the sonde 2 within the borehole. Accordingly, pulse output 190a will pass through adder-subtracter 199 on pulse line 190e to adder 203 by way of adder-subtracter output 199b. From adder 203, these pulses, which originated at pulse output 190a, will be delivered on adder output 203a to a conventional multiplexer 205, and from multiplexer 205, to a suitable depth counter 240 by means of a multiplexer output 205d.

Assuming the logging operation has commenced in a generally downward direction from the earth's surface (a reference elevation of 0 feet), it will be appreciated that as depth counter 240 accumulates or counts pulses originating at pulse 190a, the pulse count contained in depth counter 240 will be functionally related to the current depth of the sonde 2 within the borehole because each pulse at pulse output 190a corresponds to a known increment of rotational movement of sheave wheel 8, which in turn, corresponds to a known increment of linear movement of logging cable 7 and thus a known, corresponding movement of the sonde 2. This accumulated count of depth pulses in depth counter 240 may be delivered over depth counter output conductor 240a to a conventional visual display 36 to be used, for example, in monitoring the depth of the sonde 2. Alternatively, it will be noted from FIG. 3 that the depth information contained in depth counter 240 may also be delivered over depth controller line 34a to the wellsite system 11 through depth controller 33 in response to interrogation demands from master controller 40, for example, delivered to depth controller 33 on data/control signal conductor 46. It will be noted that it may be desirable to preset the indication of depth contained in depth counter 240 to a preselected depth level. This may be useful, for example, when a particular logging operation is begun at a preselected depth within the borehole, and it is known from previously derived historical data that the present indication of depth on display 36 does not correlate with depth indications of this historical data. Accordingly, appropriate preset logic 206 may be provided which, in response to a preset input 217 derived from master controller 40 through depth controller 33 on output 34a or, alternatively, in response to a manual preset 217a, will generate a preset logic output 206a which will preset depth counter 240 and the corresponding display 36 to the desired preselected depth. It will further be appreciated that because a logging operation may proceed in either a generally upward or downward, direction within the borehole, a provision must be made for instructing depth controller 33 as to the direction of travel of the sonde 2 within the borehole. This is necessary in order for the depth counter 240 to correctly count and accumulate the pulses received on multiplexer output 205a, corresponding to movement of the sonde 2 downward within the borehole, or, alternatively, to decrement an existing count contained in depth counter 240 in response to the depth pulses on multiplexer output 205a, corresponding to movement of the sonde 2 in a generally upward direction.

As above-mentioned, the depth controller determines the direction of travel of sonde 2 within the borehole, by comparing the phase lag or lead of the bi-phase pulses generaged by the above described digital shaft encoder. These phases (hereinafter referred to as phase A and B) vary relationships such that movement of sonde 2 within the borehole generates a phase angle of 90 degrees between the two phases. In one embodiment a convention has been adopted whereby movement of the sonde 2 downward into the borehole will cause phase A to lead phase B by 90 degrees. Conversely, movement of the sonde 2 upward in the borehole will cause phase A to lag phase B by 90 degrees.

Accordingly, it will be seen from FIG. 3 that a suitable direction flip-flop 191 is provided for detecting the phase information contained in the pulse output 190b which indicates the direction of travel of the sonde 2. This directional information will be conveyed on flip-flop output 191a through multiplexer 205 to depth counter 240 on multiplexer output 205a, thus instructing depth counter 240 whether to add or subtract the pulse output information being received on multiplexer output 205a.

As hereinbefore noted, in addition to information related to the depth at which logging data has been generated, in logging operations it is often desirable to have available a suitable indication of the rate at which the logging operation is being conducted, or, more particularly, the rate at which the sonde 2 is traveling within the borehole. Accordingly, the depth pulse output information contained on multiplexer output 205a may be delivered to a suitable log rate counter 35 which will count the rate of arrival of these pulses per unit of time, and thereafter deliver on log rate counter output 35a the resulting logging rate for observation on display 37. It will also be recalled that it is a feature of the present invention to command various measurements and the like in response to a control signal which may be functionally related to the depth of the sonde 2, and that it is accordingly necessary to generate a control signal at preselected depth intervals. Thus, it may be seen from FIG. 3 that a depth interrupt generator 219 is provided for receiving the depth pulses contained on multiplexer output 205a. This depth interrupt generator 219 will generate a control signal output 219a in response to receiving a preselected number of depth pulses from multiplexer output 205a. As hereinbefore noted, this control signal output 219a is routed on depth control line 34a to the depth controller 33, and thereafter may be transferred to the wellsite controller 40 and the sonde 2 for purposes herein described. It will be appreciated that the control signal output 219a is provided from depth interrupt generator 219 which may be adjusted in any desired fashion to provide a control signal output 219a at any preselected interval of depth change. This may be achieved, for example, by causing depth controller 33 to generate an appropriate output on depth control line 34a in response to a data/control signal 46 from master controller 40. It will further be noted that in response to interrogation commands from master controller 40 delivered to depth controller 33 on data/control line 46, depth controller 33 may interrogate and receive appropriate information on depth control line 34a from log rate counters 35, depth counter 240, and depth interrupt generator 219.

The depth logic 34 has previously been described as operating in a mode in which depth pulses corresponding to rotation of the sheave wheel 8 have been delivered on receive output 190a for processing. However, for testing purposes and the like, it may be desirable to disable the correction and compensation circuitry in depth logic 34 to be described hereinafter, and to provide depth information on output 34 based on an internal oscillator or an external clock, rather than from the pulses derived from rotation of the sheave wheel 8. Accordingly, an internal/external encode switch 216 may be provided. When switch 216 is in the encode position, depth logic 34 will be set to operate in the mode previously described. However, when switch 216 is set in the internal or external position, the correction circuitry of depth logic 34 will be disabled, and depth information at output 34a will thereafter be related to the pulses generated in an internal oscillator connected to oscillator input 214 or will be related to the clock rate of an external clock connected at clock input 215, respectively.

Assuming now for further purposes of illustration that it is desirable to alter the number of depth pulses on pulse line 190e prior to their delivery on multiplexer output 205a to log rate counter 35, depth counter 240, and depth interrupt generator 219. More particularly, it will be assumed that it is desirable to add additional pulses to or subtract existing pulses from the depth pulses carried on pulse line 190e in a continuous manner for the duration of time over which this pulse output 190a is present. As is well known in the art, there are numerous reasons for desiring this feature. For example, it may be known that the circumference of the sheave wheel 8 has been reduced a predetermined amount due to frictional wear against the logging cable 7 such that the functional relationship between the distance between depth pulses generated by rotation of sheave wheel 8 on pulse output 190a and the travel of logging cable 7 over the sheave wheel 8 has changed and it is accordingly desired to compensate for this wear. It may also be desirable, for example, to subtract a preselected number of pulses from the depth pulses generated by rotation of the sheave wheel in order to compensate for the fact that due to stretch of logging cable 7 while the sonde 2 is being withdrawn from the borehole, the number of depth pulses generated by the sheave wheel 8 which corresponds to the travel of the logging cable 7 over the sheave wheel 8 does not correlate with the travel of the sonde 2 within the borehole. Accordingly, the depth logic 34 may be provided with a continuous correction circuit 196, which will generate a number of depth correction pulses on output 196a for a predetermined number of depth pulses generated by rotation of sheave wheel 8 which are present on pulse output 190a.

It will be further noted that these correction pulses present on output 196a will be delivered to conventional pulse shaper circuitry 200 and will thereafter be delivered on pulse shaper output 200a to adder-subtracter 199. A logic control 198 may also be provided which, in response to an appropriate switch setting at no correction/addition/subtraction input 210, will generate a logic control output 198a which will, in turn, cause adder-subtracter 199 to either make no corrections to the depth pulses contained on pulse line 190e, or will cause adder-subtracter 199 to add or subtract correction pulses or pulse shaper output 200a, respectively, to the depth pulse on pulse line 190e. After the appropriate addition or subtraction of pulses has occurred in adder-subtracter 199, the resulting depth pulse information, which has now been corrected as desired, will be passed on as hereinbefore explained on adder-subtracter output 199b for eventual display on displays 36–37, and the like, or in the alternative, will be passed on adder-subtracter output 199a to a yo-yo detector 202 which will hereinafter be explained in greater detail. It will be noted that in order for continuous correction circuit 196 to generate a preselected number of correction pulses in relation to another preselected number of depth pulses generated by rotation of sheave wheel 8 as previously noted, it is necessary to provide continuous circuit 196 with information related to the number of depth pulses being generated and the number of correction pulses desired. Accordingly, it will be seen from FIG. 3 that information relating to the number of correction pulses desired may be delivered to continuous correction circuit 196 by an appropriate output 194a of a depth correction switch 194, which has been set at the desired number of correction pulses by input 209. In like manner, information related to the number of depth pulses which are being generated by rotation of sheave wheel 8 is conveyed to continuous correction circuit 196 on input 195c. It will be appreciated that instant yo-yo correction circuitry 195, like continuous correction circuit 196, is generating correction pulses which will be added to or subtracted from the depth pulse information on pulse line 190e, in a manner to be hereinafter described so as to correct for yo-yo phenomena, and the like, as previously noted. It will also be appreciated that these correction pulses generated by correction circuitry 195 and 196 must not interfere with each other in that they will be altering the same pulse information contained on pulse line 190e. Accordingly, continuous correction circuit 196 derives its necessary information related to production of depth pulses on input 195c from correction circuitry 195 so as to avoid generating correction pulses at the same time. However, it will be noted that correction circuit 196 is still receiving depth pulse information from pulse output 190a in that this information is being transferred on instantaneous yo-yo correction circuit input 190d to correction circuit 195 and thereafter is delivered on input 195c to continuous correction circuit 196.

Further, it has been above-mentioned that certain forces within the borehole act upon the logging device or the logging cable to cause changes in cable length which are not indicated by the surface measuring devices. Among these are the weight of the logging tool and the weight of the cable, connecting the tool to the cable reel at the surface of the earth, each act to induce a tension in the logging cable, causing a stretch therein which positions the logging tool at a location below that indicated by the measuring instrument at the surface. By constantly monitoring the tension impressed on the cable at the surface, and referring to previously compiled stretch tables based upon the elasticity of the cable, corrections for logging instrument mispositioned can be entered as above-described through corrections switch 193. Additionally, an independent depth measuring system (not shown) may be incorporated into the logging sonde which consists of a graviatational-force sensitive device, calibrated in acceleration units, situated in the subsurface tool along its longitudinal axis. The system includes a means of transmitting information obtained from the acceleration device to the surface and into master controller 40. This information is detected and integrated twice with respect to time to establish the distance moved by the instrument along the borehole. Utilizing controller 40 to generate the necessary pulses, correction pulses can then be generated and compiled through the appropriate input into corrections switch 193.

In yet another embodiment, the signal developed by the above-mentioned acceleration measuring instrument is coupled into master controller 40 where the signal is integraged once with respect to time to develop the velocity ot the tool. This velocity is compared with the velocity of the cable as it is payed out in the logging operation. A zero difference between the cable velocity and the instrument velocity indicates that the subsurface instrument is moving at the same speed as the cable at the surface. However, any difference in velocity between the two in either the uphole or downhole direction is used to generate pulses which may be added or subtracted to or from the pulse stream from the shaft encoder 9. The number of pulses so subtracted or added will be proportional to the mangitude of the acceleration such that the rate of change of pulses is directional proportional to the rate of change of instrument velocity.

Additionally, various forces within the well act on the logging instrument to slow it down. When this occurs in an upward traverse of the well, the cable begins to stretch and the instrument is situated again in a position different than indicated by the surface bearing device. As the instrument frees, it may override the position indicated by the surface indicator device and go through a series of oscillations termed in the art "yo-yo" until it once again is at the position approximately indicated by the surface measuring instruments.

This phenomena results in a back or bucking rotation of sheave wheel 8 acting in opposition to the direction in which the cable 7 is being played out. When this occurs the sheave wheel 8, instead of rotating smoothly and continuously in one direction, actually alternates with short counter rotation to the direction of cable play out. This results in phase changes in the pulses produced by rotation of sheave wheel 8 which are coupled through direction flip-flop 191 into direction change detector 201 over signal lines 191a and 205b. A direction change window is preferably included in direction change detector 201 which permits the cable passing over sheave wheel 8 to change direction within a certain preselected amount of cable movement before the depth logic changes the manner in which pulses handled by the correction circuitry. By way of example and not by way of limitation, the present embodiment detection window is set for one half foot of counter rotational travel of cable 7 before the logic circuitry reinitializes to an opposite function where if pulses were being added they begin to be subtracted and vice-versa. Up to that limit, the yo-yo detector 202 adds or subtracts sufficient pulses to account for the amount of counter movement of the cable by setting a counter and adding or subtracting the number of pulses required to zero out the counter.

It becomes apparent that in normal operation, pulses received on 190a are coupled through multiplexer 205 and to log rate counters 35, depth counters 240 and depth interrupt generator 219 for use as a depth indication by master controller 40. Additionally, if it is desired to start at a depth other than zero, preset logic 206 is utlilized to initialize depth counters 240 to the desired state. This may be done either manually over input 217a or under the control of wellsite master controller coupling a command through depth controller over line 34a into the preset logic 206. Further, pulses on 190a are sampled by direction flip-flop 191 to detect phase which indicates a direction of travel of the sonde within the borehole. This sampling is coupled through logic control 198a into adder/subtracter 199 whereby the incoming pulses are added or subtracted according to the direction of sonde movement within the hole. For example, as the sonde moves downward into the hole, pulses received on 190e are coupled through adder/subtracter 199, adder 203 and multiplexer 205 to provide an output signal 205a. However, if the logging sonde is moving upward through the borehole logic 198 and adder/subtracter circuit 199 algebraically manipulate the positive pulses on 190e such that the output signal 205a reduces the indication of depth in depth counters 240. As above-mentioned, the adding or subtracting of continuous correction pulses or instantaneous yo-yo correction will be algebraically processed in accordance with the direction of sonde movement.

However, rather than adjusting output 34a for a continuous and fixed amount of compensation for cable stretch, dimensional variations of the sheave wheel 8, and the like, the precision depth signal required by the preset embodiment make it desirable to adjust output 34a on an instantaneous dynamic basis during a logging operation, so as to compensate for dimensional variations, by the above described use of a subsurface accelerometer.

Additionally, the preset embodiment provides this instantaneous compensation feature to permit the merger of two or more sets of logging data obtained from the various instruments in the tool or data taken at different times, wherein, during the logging operation and erroneous depth offset is observed in the graphical display of these two sets of data. Referring first to the desirable feature wherein a preselected number of correction pulses may be added or subtracted to another preselected number of depth pulses at any desired time in response to a manual input, it will be seen from FIG. 3 that depth logic 34 may be provided with a correction switch 193 having a manual depth addition input 207 and depth subtraction input 208. In response to either input 207 or 208, correction switch 193 will generate an output 193a causing instantaneous yo-yo correction circuitry 195 to generate a preselected number of correction pulses on output 195b for every preselected number of depth pulses received by correction circuitry 195 on correction circuitry input 190d. It will be seen that correction circuitry 195 is provided with a reset counter 197. The purpose of counter 197 is to count the number of corretion pulses generated by correction circuitry 195 which are presented on correction circuitry output 195b to reset counter 197. When the preselected number of correction pulses has been generated, reset counter 197 will generate a reset counter output 197b which will enable correction switch 193 to accept another input 207 or 208 when further depth correction pulses are desired. Using the previous example, during the couse of a logging operation it may be determined from a graphical display of logging data being received that depth indications of the data are in error and thus offset by say five feet from their proper elevation. It may therefore be desirable to distribute this five foot correction over a 1,000 foot increment of future logging data to be received and will thus be desirable to generate a sufficient number of additional depth correction pulses to be added to the next train of depth pulses indicative of 1,000 feet of movement of the sonde generated by the sheave wheel 8 to provide the necessary correction. Accordingly, and in response to depth addition input 207 and correction switch output 193a, the instantaneous yo-yo correction circuitry 195 will begin monitoring on correction circuitry input 190d depth pulses, and will generate depth correction pulses on its outputs 195b and 195a sufficient to provide one foot of correction for depth pulses corresponding to 200 feet which are received on correction circuitry input 190d. When these depth correction pulses have been generated and counted by reset counter 197, reset counter output 197b will re-enable correction switch 193, thus indicating that the five foot depth offset has been corrected and the depth correction circuitry is again available for further corrections. It will be seen that the depth correction pulses present on output 195b are delivered to a pulse shaper circuit 200 and thereafter delivered as pulse shaper output 200a to the adder-subtracter 199 previously noted. It will further be noted that the depth addition and subtraction inputs 207-208 also provide information at input 210 to logic control 198 such that logic control output 198a will instruct the adder-subtracter 199 to either add or subtract the pulses present at shaper output 200a in response to whether depth addition or depth subtraction input 207 or 208, respectively, were activated. It will also be noted that depth logic 34 may be conventionally arranged such that when a logging operation is proceeding downwardly through the borehole, depth pulses thus generated will be accumulated, whereas when a logging operation is proceeding upward from a preselected depth, generated depth pulses will be subtracted from a preselected number. It will thus be appreciated that adder-subtracter 199 must receive an indication of the direction of travel of the sonde 2 in order to correctly add or subtract the depth correction pulses generated by correction circuitry 195-196 which are present on pulse shaper output 200a to the depth pulses present on pulse line 190e. Accordingly, the logic control 198 of depth logic 34 is provided with a direction input 205c which receives on flip-flop output 191a information derived from direction flip-flop 191 indicating the direction of travel of the sonde 2. The logic control 198, in response to this information, will generate the appropriate logic control output 198a instructing the adder-subtracter 199 whether to add or subtract the pulses present on pulse shaper output 200a to the depth pulses on pulse line 190e.

Additionally, depth logic 34 is provided with a direction change detector 201 which, in response to flip-flop output 191a from direction flip-flop 191, which is carried to input 205b of direction change detector 20, will generate a detector output 201a which is transferred to yo-yo detector 202. Yo-yo detector 202 may be designed to provide an output 202b in response to an indication on detector output 201a that the direction of travel of the sonde 2 has changed. This yo-yo detector output 202b will then cause adder 203 to prevent any depth pulses contained on adder-subtracter output 199b or pulse shaper output 204a from being passed on for counting in depth counter 240.

As above-described, there may be instances when it is not desirable for detector 202 to prevent passage of depth pulses through adder 203 in response to detector output 201a. For example, the sonde 2 may be volitionally caused to reverse directions so as to re-log a portion of the borehole. It will be further noted that a pre-determined minimum time interval may be required during which the sonde 2 pauses at a depth interval prior to intentional direction reversal being effected. Thus yo-yo detector 202 may be provided with appropriate circuitry to inhibit its activation in response to a direction change output 201a unless, in addition to presence of such an output 201a, the sonde 2 has paused a preselected time interval before proceeding in the reversed direction. Yo-yo detector 202 may further be provided with an up-down counter which will begin incrementing and counting depth pulses present on yo-yo detector input 199a when a direction change indicated on detector output 201a has been received. When the sonde 2 again changes directions and begins moving in the desired direction, the detector output 201a will reflect this direction change and thus cause the up-down counter of yo-yo detector 202 to being counting down from the last number accumulated in response to depth pulses present on yo-yo detector input 199a. When the up-down counter of yo-yo detector 202 has reached zero, this indicates that the sonde 2 is now located at the point at which it changed direction of travel and began traveling in the undesired direction. Accordingly, when the up-down counter of yo-yo detector 202 reaches zero, a yo-yo detector output 202b will be generated activating adder 203 so as to reenable the adder 203 to begin passing depth pulses on its output 203a to the depth counter 240 for proper incrementing or decrementing, as hereinbefore described. Thus, in summary, it will be noted that direction change detector 201 and yo-yo detector 202 provide the function of determining when the sonde 2 has begun oscillating in an undesired direction, and to further prevent depth pulses generated during this excursion of the sonde 2 in an udesired direction from being passed on for counting. Detectors 201–202 provide the further function of allowing depth pulses to be passed on for counting at the moment the sonde 2 has returned to the point at which it began moving in the undesired direction and has now resumed movement in the desired direction. It will thus be appreciated that yo-yo detector 202 broadly serves the purpose of filtering out depth pulses generated while the sonde 2 has oscillated from a detected point within the borehole.

It will be noted that yo-yo detector 202 may be designed such that if the sonde 2 excursion after a direction change exceeds a predetermined distance, corresponding to the up-down counter of the yo-yo detector 202 exceeding a preselected number, detector 202 will be reset to zero and the adder 203 will nevertheless be enabled, allowing depth pulses to continue to be passed on the depth counter 240. In such a case, it may further be desirable to generate depth correction pulses to replace depth pulses which were not permitted to pass through adder 203 while the up-down counter of yo-yo detector 202 was counting. Accordingly, yo-yo detector 202 may be provided with a yo-yo detector output 202a which will activate corrections switch 193 in like manner to activation caused by depth addition and subtraction inputs 207 and 208, respectively. Correction switch output 193a from correction switch 193, generated in response to yo-yo detector output 202a, will activate instantaneous yo-yo correction circuitry 195 which, in turn, will generate the appropriate depth correction pulses in a manner similar to generation of depth correction pulses caused by inputs 207–208. These depth correction pulses appearing on correction circuitry output 195a will thereafter be delivered to conventional pulse shaper circuitry 204, the output 204a of which will cause adder 203 to add the thus generated depth correction pulses to the depth pulses on the adder output 199b.

Referring also to FIG. 2, it may be seen that the corrected depth signal 34a is coupled into depth controller 33 which acts as a buffer, maintaining the correct depth signal until interrogated by wellsite master controller 40. When thus interrogated, the corrected depth signal is transferred into wellsite master controller for use in generating command and control signals for use in commanding subsurface measurements to be initiated with the measurement data thus obtained processed as hereinafter described in further detail.

Referring now to FIG. 4, there may be seen a functional representation of pulse code modulation section 6 of sonde 2. As will hereinafter be explained in detail, the circuits comprising the pulse code modulation section 6 may deliver a digital representation of measurements obtained by the various logging sections contained in sonde 2 including the radioactivity logging sections 3, the induction logging section 4 and the resistance logging section 13 to wellsite system 11 through logging cable 7, in response to depth derived command and control signals received from master controller 40. However, it will be noted that measurements taken in sonde 2 may also be delivered to the surface position of wellsite system 11 in a conventional manner as analog or pulse signals without first being processed by pulse code modulation section 6. The pulse code modulation section 6, as depicted in FIG. 4, is adapted to receive commands from master controller 40 on conductor 7a of logging cable 7, which are communicated to synchronization detector circuit 120. Detector circuit 120 is provided to detect information carried on conductor 7a related to the information desired to be received from sonde 2 by wellsite system 11, as well as the order in time at which it is desired to be received. For example if the last in a preselected number of requested acoustic transmitting firing signals has been generated by firing circuit 66. This information may be conta-ned on conductor 7a which will be detected by synchronization circuit 120. Information regarding acoustic section 5 firing is present on conductor 7a because the signals firing the transmitters of acoustic logging section 5 will be generated by wellsite system 11 at predetermined depth intervals. Thus, an acoustic signature present on output 115a of acoustic logging section 5 will be transmitted to the surface for processing as above described. When the last of the sequential firing signal is detected by synchronization circuit 120 on cable 7a, circuit 120 initiates a timing sequence to be outputted from timer 121. This timing sequence causes section 6 to transmit information obtained from other logging sections at a time when an acoustic signature signal is not present on output 115a, thus avoiding well known cross-talk problems.

Additionally, conventional logging cables such as 7a have a limited bandwidth. By interleaving the measurement data in the form of analog, digital, and pulse signals during transmission to the surface, the limited bandwidth of cable 7a will not be exceeded, thereby avoiding degradation of the signal.

Assume, for illustrative purposes, that it is desired to alternately transmit to the surface an analog output such as output 115a of acoustic logging section 5 followed by data present in pulse code modulation section 6. When a pulse is detected by synchronization circuit 120 signifying the presence, for example, of the last acoustic transmitter firing signal on conductor 7a, the detected pulse will be transferred on synchronization output 120a to appropriate timing circuitry 121. Timing circuitry 121 is adapted to provide numerous functions in response to information contained on conductor 7a. First, timing circuitry 121 provides a preselected time delay to permit acoustic vibrations introduced into the formation to dampen out. Next, timing circuit 121 will generate timing signals 121a and 121b for delivery to analog channel multiplexer 122 and pulse/digital channel multiplexer 125, respectively. It will be noted, as hereinbefore previously discussed, that analog measurements from various logging sections contained in sonde 2 may preferably be introduced into analog channel multiplexer 122. Multiplexer 122 may then conveniently select the desired analog channel input in response to timing signal 121a for conversion to digital form by analog-to-digital converter 123 after delivery thereto on multiplexer output 122a. For purposes of illustration, FIG. 4 illustrates that analog signals may preferably be introduced into multiplexer 122 which may include output signal 95 from induction logging section 4, or calibration, temperature and cable head voltage signals 128-130, respectively. In like manner, any digital measurements present in sonde 2 may conveniently be coupled to pulse-digital channel multiplexer 125 for transmission to the surface. For example pulse code modulation section 6 may include suitable radiation counters 126 and 131 which may receive short space data output line 80 and long space data output line 82, respectively, from radioactivity logging section 3. In response to further timing signals 121c and 121d from timing circuit 121, counters 126 and 131, respectively, may deliver on outputs 80a and 82a information contained in counters 126 and 131 to pulse/digital multiplexer 125 for transmission to the surface.

It will be appreciated that these outputs 80a and 82a will contain radiation counts functionally related to short and long space radiation data which are allowed to accumulate in R/A counters 126 and 131 between the depth-generated timing signals which initiate delivery of the pulse counts from the counters to pulse digital multiplexer 125. Upon transmission to the surface, and referring also to FIG. 2, the long and short space radiation data are coupled into R/A counters 30 which, under the control of wellsite master controller 40, initiates a depth to time conversion whereby a count rate of long and short space radiation can be obtained over a selected increment of borehole depth.

It will further be appeciated that the various timing signals generated by timing circuit 121 may preferably be functionally related to desired time and order of sampling of measured parameters and to indications of depth generated from wellsite system 11 and transferred on conductor 7a to section 6, so as to cause the sampling of parameters within the borehole at predetermined depth intervals, times and sequences.

Timing circuit 121 may also generate an appropriate sample rate signal 121e which controls the rate at which analog-to-digital converter 123 will convert the analog information present at the inputs to analog channel multiplexer 122. It will further be seen from FIG. 4, that pulse code modulation section 6 is provided with reset circuitry 135. It will be noted that timing circuit 121 in the present illustration, must be inhibited from generating timing signals causing the sampling and transmission of data presented to multiplexers 122 and 125 until the acoustic information contained on output 115a of acoustic logging section 5 is no longer present. Still further, it will be noted that in order to accomodate transmission of analog signals as well as digital signals, transmission of digital data must be halted to permit the analog data to be transmitted. Thus, it will be necessary for timing circuit 121 to be reset at appropriate intervals thereby stopping digital data transmission. Accordingly, reset circuitry 135 receives time impulses from timing circuit 121 on conductor 135b. Upon receipt of a predetermined number of pulses, reset circuit 135 institutes a reset signal over conductor 135a to timing circuit 121, reinitiating the circuit into a quiescent state awaiting an initialization pulse from synchronization detector circuit 120 over conductor 120a. The number of clock pulses required to initiate the reset pulse from reset circuit 135 is dependent upon the data format and quantity which is to be transmitted to the surface. In one exemplary embodiment of the present invention, six data channels are provided for pulse and nine data channels are provided in analog channel multiplexer 122 for receiving and coupling analog data into analog to digital converter 123.

In the above-described channel allocation, the timing sequence for transmitting digital data to the surface will be initiated by receipt of a synchronization or sync pulse in timing circuit 121. Upon receipt of this pulse, the timing circuit begins an internal count to permit dampening of any acoustic or analog voltages remaining in the sonde 2 surface conductors. During this time, timing circuit 121 begins coupling clock pulses into reset circuit 135 over conductor 135b. At the end of the predetermined quiescence period, timing circuit 121 enables synchronization circuit 134 which initiates a sync word which is clocked, by timing circuit 121, into line driver 127 and thence over conductor 7b to the surface for processing. Immediately following the sync word, timing circuit 121 begins clocking the data word associated with each of six pulse digital channels being input into pulse/digital channel multiplexer 125. Each word is sequentially clocked into line driver 127 for transmission as with the sync word. As the last pulse digital word is clocked into line driver 127, timing circuit 121 begins a sequentially sequencing of analog channels through analog multiplexer 122 into analog to digital converter 123. A/D converter 123 receives the analog data from each channel and converts it into digital data which is coupled into processor 124 for formatting into digital words having a preselected length. The digital data words are then clocked from processor 124 across conductor 124a and into line driver 127 where they are transmitted to the surface over conductor 7b as hereinbefore described. As the last data bit of the last analog channel is clocked out of processor 124 for transmission to the surface, the number of clock pulses coupled into reset circuit 135 reaches the preselected reset point and the reset signal is transmitted to timing circuit 121, reinitializing circuit 121 and halting pulse transmission.

Thus, in summary, it will be seen that in response to various timing signals generated by timing circuit 121 which, in turn, are generated from depth information and the like contained on conductor 7a, pulse code modulation section 6 will present on processor output 124a of processor 124, digitized representations of any combination or order of analog measurements made in sonde 2. In like manner, output 133 of multiplexer 125 will contain in any desired sequence and at any desire depth or time interval, digitized representations of desired pulse or digital measurements made in sonde 2. These outputs 124a and 133 are delivered to a conventional line driver 127 for delivery on conductor 7b of logging cable 7 to the surface processing section of wellsite system 11.

In order to decode the digital representations of the various logging parameters carried on conductor 7b, it is necessary to provide synchronization to the surface circuits of wellsite system 11. As above-described, timing circuit 121 is connected (not shown) to synchronization circuit 134 and prior to initiating transmission of pulse/digital data initiates a synchronization word for delivery to the surface. Upon detection of the synchronization word by the surface circuits, wellsite master controller 40 initiates the proper switching and processing of the following pulse and digital data words.

From the above-discussion, it becomes apparent that a plurality of different physical parameters of the subsurface formations may be measured during a single run. Also, as above-described, in the past specific logging instruments could not be utilized in the same sonde due to various operational constraints among which were conductor cross talk and the fact that an excessive number of conductors would be required to obtain meaningful data from a single logging instrument. For example, the above-described system permits the simultaneous use of two instruments never run simultaneously in the prior art, mainly: a dual induction log, and a dual laterolog.

Both of the above-mentioned instruments are well known in the art and each requires multiple conductors to make the necessary measurements which can be correlated into meaningful data. When combined with the conductor requirements for power to operate the subsurface instruments, the standard 7 conductor logging cable does not have enough conductors to permit the two instruments to be run together. Additionally, the described embodiment is directed to a system which permits the acquisition of data in both analog and digital forms. As depicted in FIG. 4, information coupled into the analog channel multiplexer 122 will be thereafter converted into a digital format for transmission to the surface. For some parameters, however, it may desirable to obtain the lithological information in analog form. For example, it may be desirable to obtain the acoustic signature of the subsurface lithology in the form of an analog signal as will be hereinafter described in greater detail.

Figure 5:
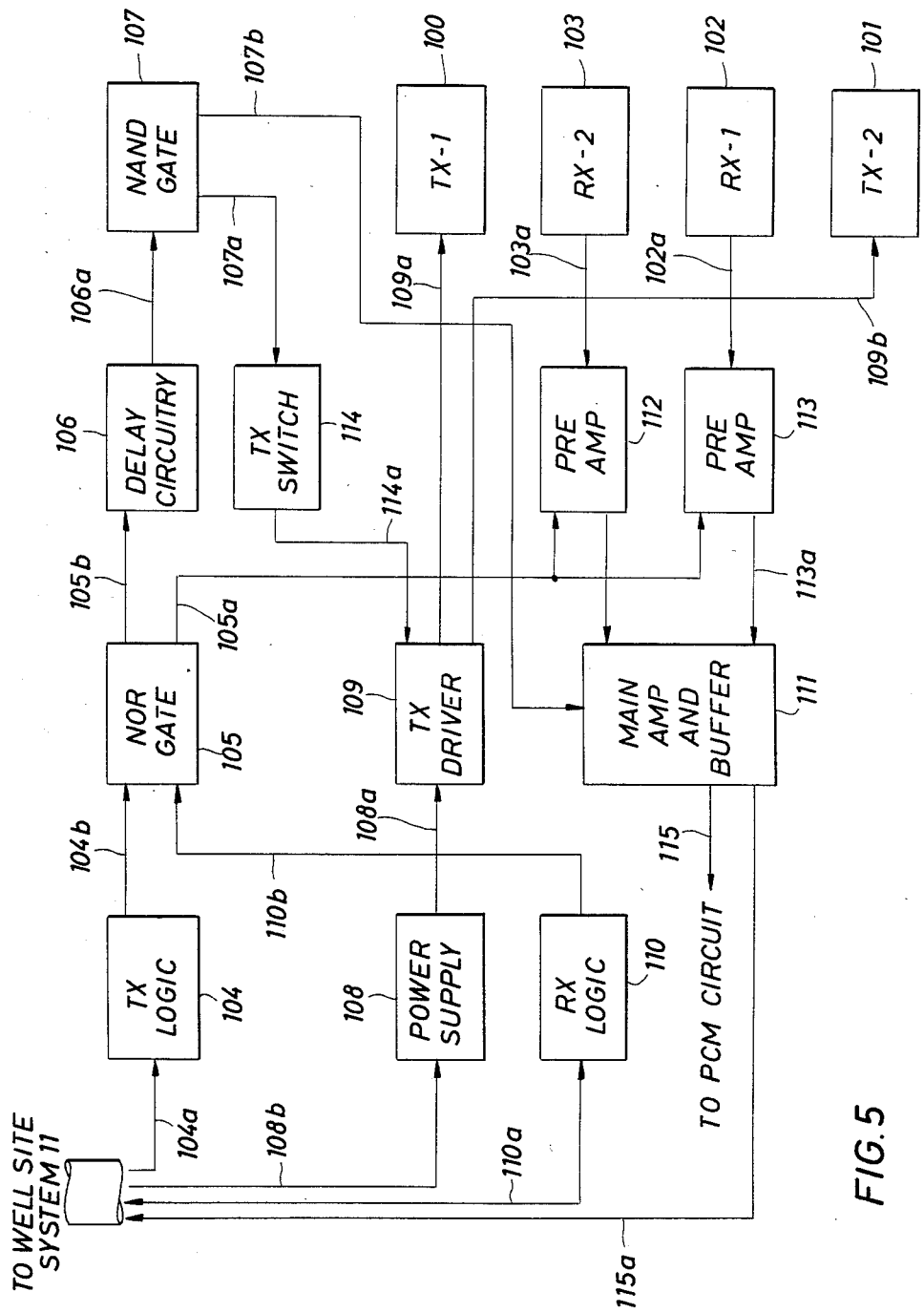
FIG. 5 is a more detailed functional representation of a typical analog circuit forming a portion of the sonde depicted in FIG. 1.

Referring now to FIG. 5, there may be seen an acoustic logging section 5 of sonde 2 which may be employed with wellsite system 11 to measure sound transmission characteristics of rock strata penetrated by a well bore. These characteristics, in turn, may be functionally related to physical parameters useful in determining hydrocarbon content, such as porosity. Accordingly, in a typical embodiment of acoustic section 5 contained in sonde 2, a pair of acoustic transmitters 100 and 101 are provided for delivering bursts of acoustic energy to the surrounding formation as desired in response to appropriate signals generated from wellsite system 11 or, alternatively, generated within sonde 2. It may further be seen that a corresponding pair of acoustic receivers 102 and 103 may be provided for receiving acoustic energy from the surrounding formation in response to the acoustic bursts delivered by transmitters 100-101. In the preferred mode of operation of acoustic section 5 according to the present invention, control signals from wellsite 11 which control the timing of the firing of transmitters 100 and 101 as hereinbefore noted may be preferably communicated on an appropriate conductor 104a of logging cable 7 to suitable transmitter logic circuitry 104. In like manner, receiver logic circuitry 110 may be provided for receiving signals preferably from the wellsite system 11 on conductor 110a of the logging cable. After processing the signal on conductor 104a which contains information regarding the order of transmitter firing and the like, logic circuitry 104 may be adapted to generate an output 104b to NOR gate 105.

In like manner, receiver logic circuitry 110 may transmit an appropriate signal 110b to NOR gate 105 containing information related to the order of receiver firing and the like carried on conductor 110a to receiver logic circuitry 110. In response to transmitter logic output 104b and receiver logic output signal 110b, NOR gate 105 may thereafter generate an appropriate output 105a to preamplifiers 112 and 113. As hereinafter described in more detail, the purpose of output 105a is to control the gating of preamplifiers 112 and 113 to accept signals from a particular receiver 102 and 103 in a predetermined manner. It will be noted that NOR gate 105 may further provide a delay signal 105b to appropriate delay circuitry 106 which functions to allow ample time for any transients on the logging cable 7 caused by logic pulses on conductors 110a and 104a or the like to disappear prior to energizing transmitters 100 or 101. Delay circuitry 106 may further serve the purpose of allowing time for transmitter and receiver gates contained in preamplifiers 112-113 and in transmitter driver 109 to be set to their proper positions and to allow all transients generated by them to disappear. At the end of the hereinbefore noted delay generated by delay circuitry 106, a delay output 106a is delivered to a conventional dual NAND gate 107. It may be seen that NAND gate 107 is adapted so as to provide a transmitter switch signal 107a to transmitter switch 114, which, in turn, and in response thereto, transfers a transmitter switching signal 114a to a transmitter driver 109. The purpose of transmitter driver 109 is to transmit energy on its output 109a and 109b to transmitters 100 and 101, respectively, in response to transmitter switching signal 114a. This, in turn, will cause transmitters 100 and 101 to deliver bursts of acoustic energy into the surrounding formations in a conventional manner. It will be noted that transmitter driver 109, in order to supply energy to transmitters 100-101, is provided with appropriate power on line 108a from a conventional power supply 108 which preferably receives power from the wellsite system 11 on power supply conductor 108b. Upon receipt of acoustic energy from the surrounding formation in response to bursts of acoustic energy delivered by transmitters 100-101, the receivers 102-103 will deliver their outputs, which are functionally related to this energy received, on lines 102a and 103a to suitable preamplifiers 113 and 112, respectively. Outputs from these preamplifiers 113 and 112 will then be delivered on line 113a and 112a, respectively, to amplifier/buffer 111, wherein they are further amplified and transferred to suitable PCM circuitry on amplifier output 115 wherein they may be digitized and processed or directly transferred to wellsite system 11 on conductor 115a of logging cable 7 for digitization and processing. As hereinbefore explained, gating signal output 105a is provided to preamplifiers 112-113 in order to control in a predetermined fashion the time at which responses from receivers 102 and 103 are delivered to amplifier/buffer 111. In addition to amplifying acoustic signals on lines 112a and 113a for eventual transmission to the wellsite system 11, amplifier/buffer 111 may further generate a marker pulse in response to the output 107b from NAND gate 107. The purpose of this pulse is to provide indication that a transmitter has been energized in order to facilitate processing and the like of the acoustic signal contained on output 115 and 115a.

Referring now to FIG. 6, there may be seen a greatly simplified functional diagram of a portion of the circuits comprising the surface apparatus shown in FIG. 2 and which illustrate a particular configuration of a portion of wellsite system 11 suitable for obtaining, processing, recording, storing and the like, information associated with acoustic logging measurements, and more particularly, acoustic logging section 5. Referring also to FIG. 2, controller 40 may preferably generate logging data command signals 44 which may be communicated to a suitable transmitter firing circuit for triggering transmitters 100-101 and receivers 102-103 (shown in FIG. 4), and the like.

In response to a suitable transmitter firing signal 66a received by acoustic logging section 5 on logging cable 7, acoustic energy is delivered to and received from the formation by acoustic logging section 5, and presented on logging cable 7. Accordingly, and as more particularly illustrated in FIG. 6, these acoustic responses may conveniently be communicated on logging cable 7 to line control circuit 23 which may select the appropriate conductor of logging cable 7 containing these responses. These selected measurement signals may thereafter be transferred as output 24 to signal conditioning circuit 25 where the signals are processed as above described for FIG. 2.

Further, it may be desirable to display various information associated with acoustic logging section 5 such as real time acoustic signatures for purposes of monitoring and the like. Accordingly, a conventional oscilloscope 185 may be provided for such purposes. More particularly, acoustic information present on output 26 may be transferred as acoustic signature signal 180a to a suitable amplifier 184 and thereafter to the oscilloscope 185 on output 184a. Moreover, it may be a desirable feature to provide marker generator circuitry wherein information in addition to the acoustic signature signal 180a and functionally related thereto may be simultaneously displayed in the form of visible markers or indicators on oscilloscope 185. Accordingly, this circuitry may preferably be composed of a clock 181 which communicates timing signals on output 181a to a downcounter 182 which, in turn, may be conventionally arranged so as to compare signal from clock 181 with information from the master controller 40 communicated to downcounter 182 in data command signal 44. Upon such comprison, the counter 182 may preferably provide a counter signal 186 to a suitable one shot multivibrator 183 which, in turn, may generate a conventional pulse output 187 which is transmitted to amplifier 184 for display on oscilloscope 185.

As above described, the depth-dependent transmitter firing signal used to drive the transmitter logic 104 is additionally coupled into sync detector circuit 120 as a command for initiating the digital encoding and uplink of measurement provided by data PCM circuit 6. Thus, it may be seen that the above-described embodiment of the invention provides the capability of generating depth dependent commands and transmitting them to the subsurface logging instrument to provide the capability for simultaneoulsy making a plurality of difference, depth related measurements of the subsurface formation lithology and of correlating the data thus obtained on a depth dependent basis.

As previously discussed, one direction the prior art has taken is to digitize all measurement data in the logging instrument. However, this has generally been done in an asyncnmous manner which requires the logging rate to be reduced so that the vast quantity of measurement data produced by the logging instrument is not introduced into the buffer at a rate faster than the circuitry can handle whereby data is lost by either incoming data writing over the data already in the buffers or by the buffer holding the first data written in and blocking entry of additional data until the data in the buffers is transmitted. As will be hereinafter explained in greater detail, the above mentioned problem is overcome with an alternative embodiment of encoding circuitry for providing duplex communication of data and command from the surface to the logging instruments and for digitally encoding all measurement data for transmission to the surface in response to downlinked commands.

It is apparent from the above-described embodiments of the present invention that a multi-instrument logging tool may be assembled and used with the system to provide all desired logging information in a single pass. However, certain constraints become evident upon assembling a plurality of conventional logging instruments into a single tool. For example, at least one class of instrument requires a mandrel of a non-metallic material which is not strong enough to support the weight of additional instruments suspended below it. Accordingly, when assembling a multi-instrument tool, this class of instrument will be positioned on the distal end of the tool from the connection with the logging cable. Further, the conventional acoustic logging mandrel is formed of slotted steel to permit the acoustic energy to be transmitted into the surrounding formations. While stronger than the above-described non-metallic mandrel, the slotted steel mandrel of the acoustic instrument has insufficient strength to support a number of other instruments suspended therefrom. Again, the acoustic instrument should be positioned near the lower extremity of the logging tool, preferably adjacent the instrument having the non-metallic mandrel. As another constraint, several of the conventional instruments utilized in forming a multi-instrument tool do not contain provision for passing extra electrical conductors through the length of the tool.

Additionally, ease of operation in logging is a great consideration. As the various conventional nuclear radiation detecting devices can be calibrated in a single unit, it is therefore desirable to assemble them in abutting relation. After calibration, they can then be connected with the acoustic instrument to form the multi-instrument logging tool.

Accordingly, in one preferable embodiment a multi-instrument tool has been assembled wherein various logging instruments are positioned on either side of the telemetry of PCM encoder section. In one particularly exemplary embodiment the following tools listed in terms of descending order into the borehole from the interconnection with the logging cable were formed into a multi-instrument tool: a density logging instrument; a compensated neutron logging instrument; a gamma ray logging instrument; a telemetry of PCM adapter/encoder; an acoustic logging instrument; and an induction logging instrument. However, the instruments contained in the logging tool are such that any one could be removed from the above-described string and the remaining parts interconnected into a second embodiment of the multi-instrument logging tool. Additionally, additional tools may be added to the above-described tool string such as the inclusion of a dual laterolog between the PCM adapter/encoder and the acoustic logging instrument or by the addition of a casing collar locator positioned between the logging cable and the density logging instrument. As a result, it will be apparent to those skilled in the art that the overall concept of the present invention is directed to providing methods and apparatus for obtaining information of subsurface formations during a single logging pass and utilizing one or more logging instruments interconnected to form a logging tool.

Referring now to FIG. 7, there is depicted in block diagram from an alternate embodiment of the circuitry for providing communications between the surface and subsurface units. As shown, wellsite system 11 interfaces with a surface communicator subsystem 17 which acts as the telemtery/command interface circuits 39 depicted in FIG. 1. Again, a seven conductor logging cable 7 provides for communications of data/commands between the surface unit and the subsurface sonde 2.

In this embodiment, sonde 2 includes a subsurface master control unit 18 which provides the only telemetering link between the surface and subsurface. Also contained within the sonde 2 are the plurality of remote units each interfaced to a particular well logging instrument with each remote unit interfaced to the subsurface master control unit 18 by an instrument bus 19. All information exchanges across the instrument bus are digital. Analog to digital conversion takes place in the remote unit or in the individual instrument. However, universal measurements such as cable head voltage, wellbore temperature and the like are provided within the master control unit 18.

Remote units are essentially slaves to the master control unit. That is, they do not participate on the instrument bus without a direct command from the master control unit. Accordingly, sequencing, data acquisition commands, and control commands are all functions originating in the master control unit 18.

Subsurface master control unit 18 provides half duplex communications with the surface via logging cable 7 through surface communicator 17. Cable communications is based on use of data encoder-decoders. For example, Manchester encoder-decoders configured as a UARTS are used as the surface and subsurface communicator units 17 and 18 respectively. This allows duplex transmission of measurement, control and command data from wellsite system 11 to subsurface control unit 18. In a like manner, UARTS are used to provide communication from unit 18 to remote units 20 for controlling the logging instruments 3, 4 and 13 which are incorporated in the subsurface sonde 2.

From the foregoing description, it will be apparent to those skilled in the art that many modifications and variations besides those specifically mentioned may be made in the techniques and structure described herein and depicted in the accompanying drawings without departing substantially from the concept of the present invention. For example, the above described system has, in general, dealt with use of logging instruments for obtaining measurements useful in locating subsurface oil and gas deposits. However, it will be apparent to those skilled in the art that logging instruments designed to assist in completion of the well may be utilized in place of the above described instruments. Further, it also becomes apparent that production logging instruments such as those used to interpret pressure, temperature and for the parameters associated with a producing well may also be utilized with the above-described system. Accordingly it should be clearly understood that the forms of the invention described and illustrated herein are exemplary only, and are not intended as limitations of the scope of the present invention.

The embodiments of the invention in which an exclusive property or privilege is claimed are defined as follows:

1. Apparatus for investigating subsurface materials traversed by a borehole, comprising:
    a well logging tool suspended in and moveable through a borehole at the end of an electrical cable, said tool comprising a plurality of sensing elements for measuring a plurality of physical characteristics of earth materials surrounding a borehole, one of said sensing elements being responsive to the acoustic characteristics of said earth materials;
    measuring means for deriving depth signals, said depth signals corresponding to the movement of preselected and regularly spaced intervals of said cable as a function of the movement of said tool within said borehole;
    command means responsive to said depth signals for generating and transmitting command signals to said tool for initiating measuring sequences of said acoustic sensing element;
    detector means responsive to said command signals for deriving synchronization signals, said synchronization signals corresponding to said measuring sequences of said acoustic sensing elements;
    timing means responsive to said synchronization signals for generating timing signal sequences; multiplexer means responsive to said timing signal sequences for sequencing the transmission of said plurality of physical characteristic measurements, said transmission being subsequent to the transmission of measurements from each of said acoustic measuring sequences; and
    line driver means for transmitting said sequence of physical chracteristics through said cable to the surface.

2. The apparatus of claim 1, wherein said measuring means comprises:
   means responsive to the movement of said cable for generating electrical signals composed of marker pulses each marker pulse indicative of a sequential increment of the length of said borehole;
   counter means for progressively counting said marker pulses; and
   totaling means for deriving preselected totals of said marker pulses, said totals representative of said preselected and regularly spaced intervals of said borehole.

3. The apparatus of claim 2, wherein said preselected and regularly spaced interval in said borehole is approximately one-quarter foot of movement of said cable relative to said tool.

4. The apparatus of claim 1, wherein said multiplexer means comprises:
   an analog channel multiplexer for selecting and sequencing analog input signal measurements in response to said timing signals; and
   a pulse/digital channel multiplexer for selecting and sequencing pulse and digital input signal measurements in response to said timing signals.

5. The apparatus of claim 4, wherein said analog channel multiplexer comprises nine data channels and said pulse/digital channel multiplexer comprises six data channels.

6. The apparatus of claim 4, further including conversion means for converting said analog signal measurements to digital form and for delivering said converted signals to said line driver means.

7. The apparatus of claim 6, wherein the conversion rate of said conversion means is established by said timing signals from said timing means.

8. The apparatus of claim 7, further including processor means coupled to said conversing means for formatting said converted signals into digital words.

9. The apparatus of claim 8, further including reset means for resetting said timing means at preselected time intervals.

10. The apparatus of claim 9, wherein said timing means is reset prior to generation and transmission of said command signals from said command means.

11. The apparatus of claim 10, wherein said well logging tool includes at least a density section, a compensated neutron section, a natural gamma radiation section, an acoustic section and an induction section.

12. A method for investigating subsurface materials traversed by a borehole with a well logging tool suspended in and moveable through said borehole at the end of an electrical cable, said tool comprising a plurality of sensing elements for measuring a plurality of physical characteristics of earth materials surrounding said borehole, one of said sensing elements being responsive to the acoustic characteristics of said earth materials, comprising the steps of:
   measuring the movement of said cable as a function of the movement of said tool for deriving depth signals, said depth signals corresponding to the movement of preselected and regularly spaced intervals of said cable as a function of the movement of said tool within said borehole;
   generating and transmitting command signals to said tool in response to said depth signals for initiating measuring sequences of said acoustic sensing element;
   deriving in response to said command signals synchronization signals, said synchronization signals corresponding to said measuring sequences of said acoustic sensing elements;
   generating in response to said synchronization signals timing signal sequences;
   sequencing in response to said timing signal sequences the transmission of said plurality of physical characteristic measurements, said transmission being subsequent to the transmission of measurements from each of said acoustic measuring sequences; and
   transmitting said sequence of physical characteristics through said cable to the surface.

13. The method of claim 12, wherein said step of measuring the movement of said cable relative to said tool comprises:
   generating electrical signals composed of marker pulses in response to the movement of said cable, each marker pulse indicative of a sequential increment of the length of said borehole;
   progressively counting said marker pulses; and
   deriving preselected totals of said marker pulses, said totals representative of said preselected and regularly spaced intervals of said borehole.

14. The method of claim 13, wherein said preselected and regularly spaced interval is approximately one-quarter foot of movement of said cable.

* * * * *